United States Patent
Jia

(10) Patent No.: US 8,270,299 B2
(45) Date of Patent: Sep. 18, 2012

(54) COMMUNICATOR-BASED TOKEN/BUFFER MANAGEMENT FOR EAGER PROTOCOL SUPPORT IN COLLECTIVE COMMUNICATION OPERATIONS

(75) Inventor: Bin Jia, West New York, NJ (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 12/267,730

(22) Filed: Nov. 10, 2008

(65) Prior Publication Data

US 2010/0122268 A1    May 13, 2010

(51) Int. Cl.
  *H04L 12/28* (2006.01)
  *G06F 15/16* (2006.01)
(52) U.S. Cl. .......... 370/235; 370/252; 709/232
(58) Field of Classification Search .......... None
  See application file for complete search history.

(56) References Cited

U.S. PATENT DOCUMENTS

| | | | | |
|---|---|---|---|---|
| 5,909,553 A * | 6/1999 | Campbell et al. | ........ | 709/236 |
| 5,931,915 A * | 8/1999 | Benner et al. | ........ | 709/232 |
| 6,178,174 B1 | 1/2001 | Franke et al. | ........ | 370/429 |
| 7,730,264 B1 * | 6/2010 | Sistla | ........ | 711/138 |
| 2006/0069788 A1 | 3/2006 | Blackmore et al. | ........ | 709/230 |
| 2007/0294435 A1 | 12/2007 | Huang et al. | ........ | 709/251 |

* cited by examiner

*Primary Examiner* — Steven H Nguyen
(74) *Attorney, Agent, or Firm* — Ido Tuchman; Libby Z. Toub

(57) ABSTRACT

A method, system, method and computer program product for facilitating collective communication in parallel computing. A system for parallel computing includes one or more communicators. Each of the one or more communicators comprises a plurality of processes. A memory pool including one or more early arrival buffers is provided. One or more tokens are assigned to a specified communicator included in the communicators. Each of the processes comprised by the specified communicator may consume any token assigned to the specified communicator. Requesting an early arrival buffer included in the memory pool requires consuming at least one token. A collective communication operation is performed using the specified communicator. The collective communication operation is performed eagerly using early arrival buffers obtained by consuming the tokens assigned to the communicator.

20 Claims, 10 Drawing Sheets

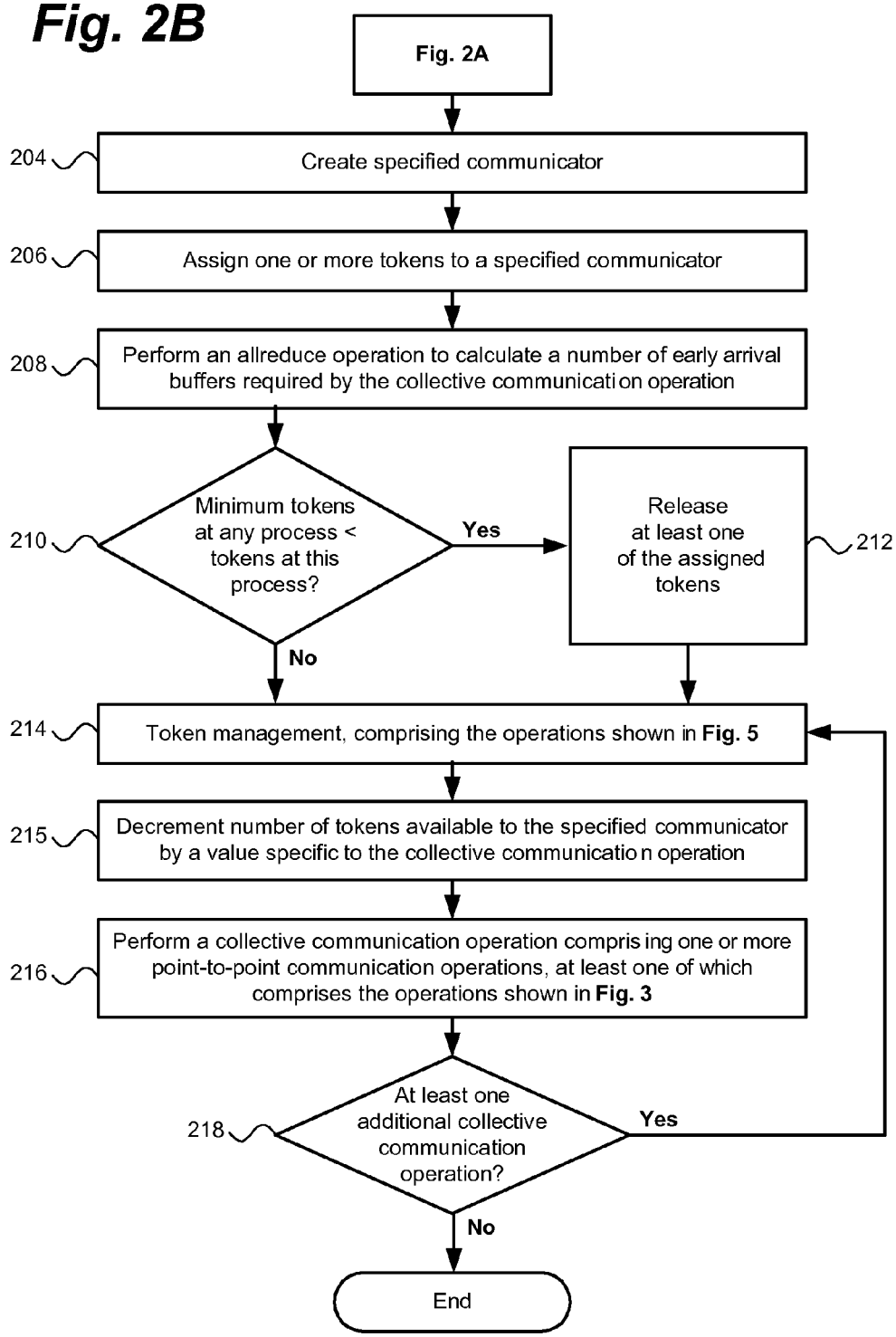

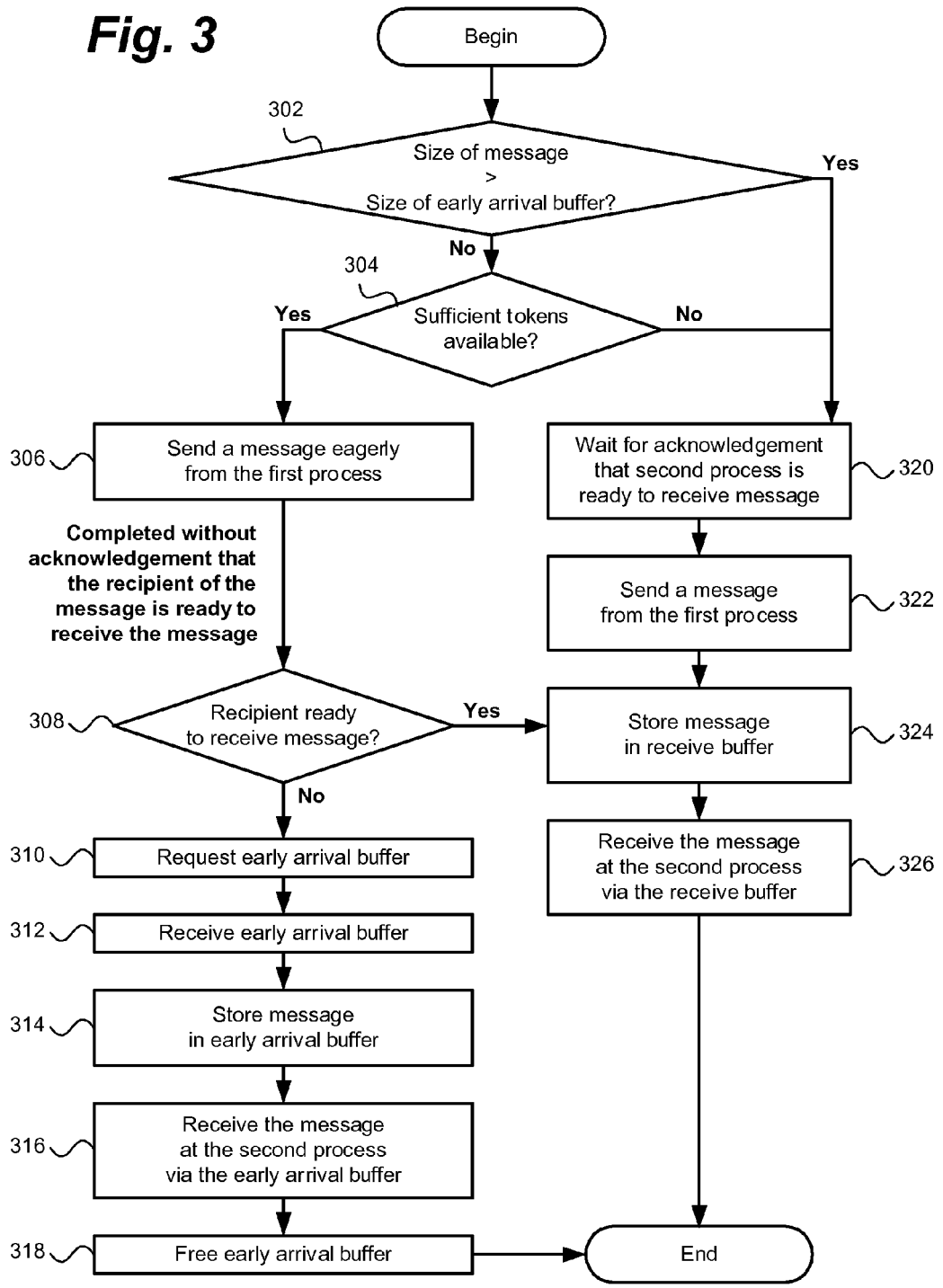

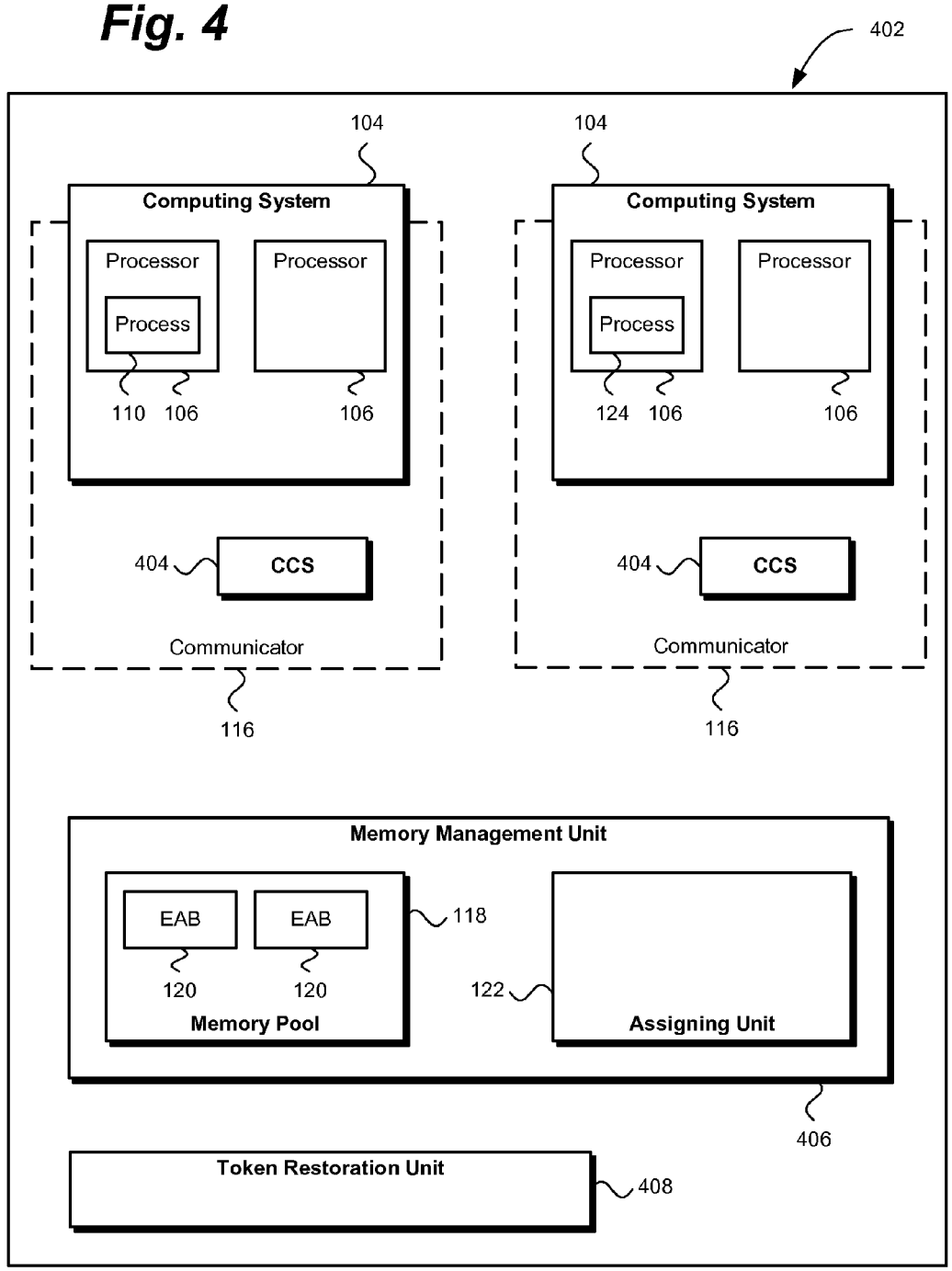

COMMUNICATOR-BASED TOKEN/BUFFER MANAGEMENT FOR EAGER PROTOCOL SUPPORT IN COLLECTIVE COMMUNICATION OPERATIONS

STATEMENT REGARDING FEDERALLY SPONSORED DEVELOPMENT

This invention was made with government support under subcontract HR-0011-07-09-0022 awarded by DARPA. The government has certain rights in this invention.

FIELD OF THE INVENTION

The present invention relates generally to parallel computing. More specifically, the present invention relates to improved techniques for managing tokens and buffers to support eager protocols in collective communication operations.

BACKGROUND

Parallel computing is the distribution of a computing operation among a plurality of processors and/or a plurality of computing systems. Parallel computing is advantageous because a computationally expensive processing task may take less time to complete if more processors are used. For example, scientific and technological research frequently comprises computational tasks which, due to their complexity, require years to complete on a single processor. However, such tasks can frequently be completed in a manageable amount of time if divided among a large number of processors. Weather forecasting and computerized simulations of real-world phenomena also frequently comprise complex computational tasks which may benefit from parallel computing. Parallel computing is particularly advantageous for high performance computing, a term used in the art to denote computing tasks requiring very large amounts of computational resources.

In the message passing model, a computing task is divided among a plurality of processes in predefined ways. The participating processes communicate with each other by sending and receiving messages. For parallel computing to succeed, it is important for this inter-process communication to be effective. Thus, the processes should ideally communicate with each other according to predefined communication protocols.

The Message Passing Interface, or MPI, is a protocol standard known in the art for facilitating communication between a plurality of processors cooperating on a computing task. MPI is widely used to implement parallel computing systems and applications based on the message passing model. MPI defines semantics of various types of communications. Specifically, MPI defines sending and receiving interfaces for point-to-point communications between two processes. MPI also defines a set of operations for collective communications among multiple processes. MPI is the de facto standard for communication interfaces in parallel computing.

SUMMARY OF THE INVENTION

The present invention introduces improved techniques for managing tokens and buffers to support eager protocols in collective communication operations. Tokens are assigned to communicators. Therefore, all participating processes within a communicator generally have access to an identical number of tokens. Multiple communicators may share a common pool of buffers. Communicator-based management of tokens and buffers according to the present invention offers improved scalability, particularly in terms of memory usage. Additionally, buffers are utilized efficiently. Thus, the present invention enables even large collective communication operations to be performed using an eager protocol. Furthermore, the present invention additionally interoperates efficiently with hardware-based collective communication primitive supports.

Thus, one exemplary aspect of the present invention is a method for facilitating collective communication in a system for parallel computing. The system includes one or more communicators. Each of the one or more communicators comprises a plurality of processes. The method comprises providing a memory pool including one or more early arrival buffers. The method further comprises assigning one or more tokens to a specified communicator included in the one or more communicators. Each of the plurality of processes comprised by the specified communicator may consume any of the one or more tokens assigned to the specified communicator. The method further comprises performing a collective communication operation using the specified communicator. The collective communication operation comprises one or more point-to-point communication operations between a first process and a second process. The first process and the second process are comprised by the specified communicator. At least one of the one or more point-to-point communication operations comprises requesting an early arrival buffer. The early arrival buffer is included in the memory pool. Requesting the early arrival buffer requires consuming at least one token. At least one of the one or more point-to-point communication operations further comprises receiving the early arrival buffer after consuming the at least one token. At least one of the one or more point-to-point communication operations further comprises eagerly sending a message from the first process via the early arrival buffer such that the sending operation is completed without acknowledgment that the recipient of the message is ready to receive the message. At least one of the one or more point-to-point communication operations further comprises receiving the message at the second process via the early arrival buffer.

Another exemplary aspect of the present invention is a system for facilitating collective communication for parallel computing. The system comprises one or more communicators. Each of the one or more communicators comprises a plurality of processes. The system further comprises a memory management unit. The memory management unit comprises a memory pool including one or more early arrival buffers. The memory management unit further comprises an assigning unit configured to assign one or more tokens to a specified communicator included in the one or more communicators. Each of the plurality of processes comprised by the specified communicator may consume any of the one or more tokens assigned to the specified communicator. Each of the one or more communicators is configured to perform a collective communication operation. The collective communication operation comprises one or more point-to-point communication operations between a first process and a second process. The first process and the second process are comprised by the communicator. At least one of the one or more point-to-point communication operations comprises requesting an early arrival buffer. The early arrival buffer is included in the memory pool. Requesting the early arrival buffer requires consuming at least one token. At least one of the one or more point-to-point communication operations further comprises receiving the early arrival buffer after consuming the at least one token. At least one of the one or more point-to-point communication operations further comprises eagerly sending a message from the first process via the early arrival buffer such that the sending operation is completed without acknowledgment that the recipient of the message is ready to receive the message. At least one of the one or more point-to-point communication operations further comprises receiving the message at the second process via the early arrival buffer.

Another exemplary aspect of the present invention is a computer program product embodied in a tangible media comprising computer readable program codes coupled to the tangible media for facilitating collective communication in a system for parallel computing. The system includes one or more communicators. Each of the one or more communicators comprises a plurality of processes. The computer readable program codes are configured to cause the program to provide a memory pool including one or more early arrival buffers. The computer readable program codes are further configured to cause the program to assign one or more tokens to a specified communicator included in the one or more communicators. Each of the plurality of processes comprised by the specified communicator may consume any of the one or more tokens assigned to the specified communicator. The computer readable program codes are further configured to cause the program to perform a collective communication operation using the specified communicator. The collective communication operation comprises one or more point-to-point communication operations between a first process and a second process. The first process and the second process are comprised by the specified communicator. At least one of the one or more point-to-point communication operations comprises requesting an early arrival buffer. The early arrival buffer is included in the memory pool. Requesting the early arrival buffer requires consuming at least one token. At least one of the one or more point-to-point communication operations further comprises receiving the early arrival buffer after consuming the at least one token. At least one of the one or more point-to-point communication operations further comprises eagerly sending a message from the first process via the early arrival buffer such that the sending operation is completed without acknowledgment that the recipient of the message is ready to receive the message. At least one of the one or more point-to-point communication operations further comprises receiving the message at the second process via the early arrival buffer.

The foregoing and other features, utilities and advantages of the invention will be apparent from the following more particular description of various embodiments of the invention as illustrated in the accompanying drawings.

BRIEF DESCRIPTION OF THE DRAWINGS

FIGS. 2A and 2B show an exemplary flowchart of operations performed by the present invention to facilitate collective communication in a system for parallel computing.

FIG. 3 shows an exemplary flowchart of operations performed by the present invention to perform a point-to-point communication operation.

FIG. 4 illustrates an exemplary system for facilitating collective communication for parallel computing as contemplated by the present invention.

DETAILED DESCRIPTION OF THE INVENTION

Figure 1:
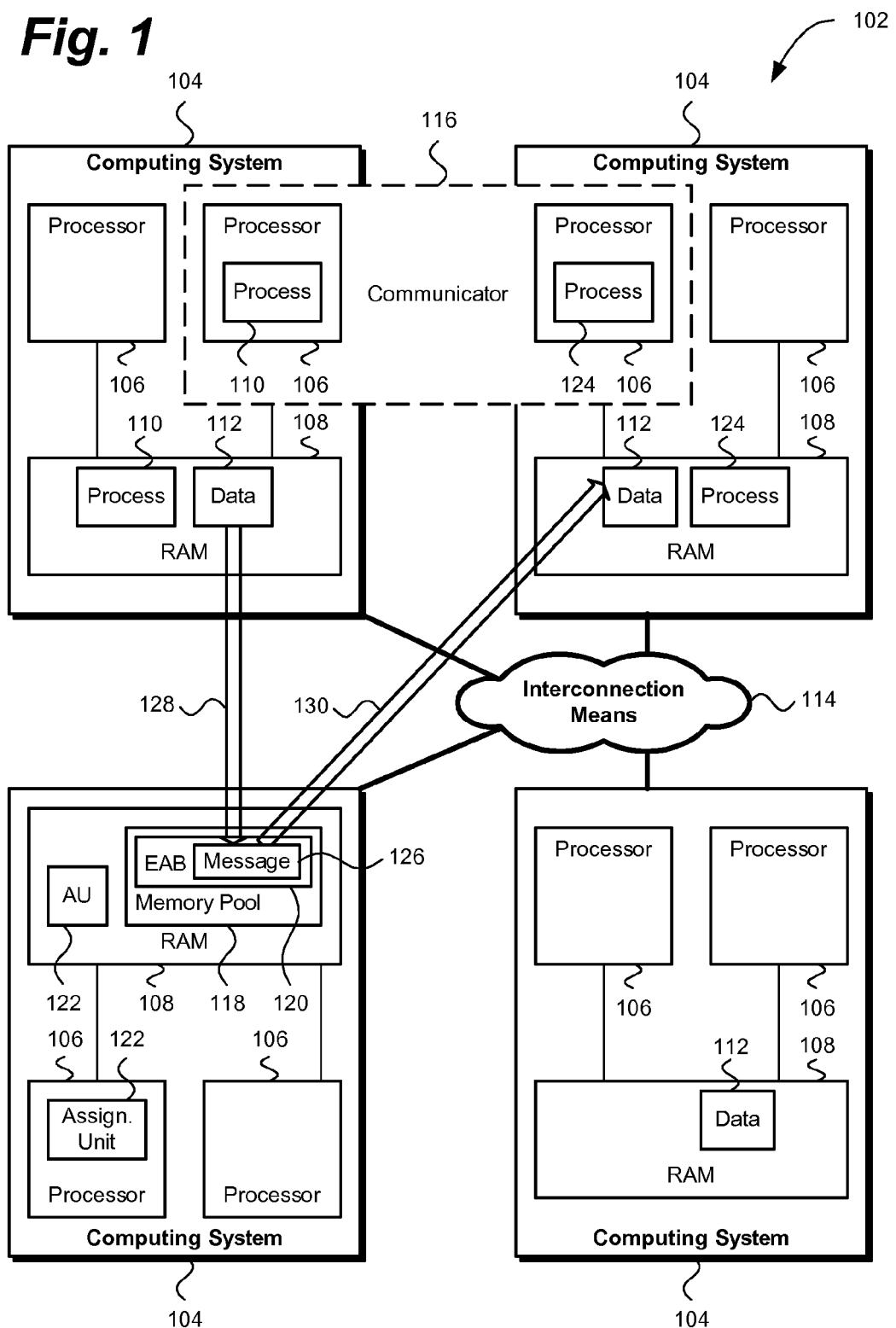
FIG. 1 shows an exemplary system for performing parallel computing as contemplated by the present invention.

The following description details how the present invention is employed to manage tokens and buffers to support eager protocols in collective communication operations. Throughout the description of the invention reference is made to FIGS. 1-6. When referring to the figures, like structures and elements shown throughout are indicated with like reference numerals.

FIG. 1 shows an exemplary system 102 for performing parallel computing as contemplated by the present invention. The system includes one or more computing systems 104. It is contemplated that each computing system 104 is a general purpose computer. However, a computing system 104 may comprise specialized electronic devices configured to perform a predetermined computing operation. The computing systems 104 may be based on a wide variety of architectures. The computing systems 104 may execute any of a wide variety of operating systems known in the art, including without limitation the IBM® z/OS® operating system, the IBM AIX® operating system, the Linux® operating system or the Windows® operating system. IBM, z/OS and AIX are registered trademarks of International Business Machines Corporation, Armonk, N.Y., United States, in the United States, other countries, or both. Linux® is the registered trademark of Linus Torvalds in the United States and other countries. Windows is a registered trademark of Microsoft Corporation, Redmond, Wash., United States, in the United States and/or other countries. Each computing system 104 may be connected to a variety of peripheral devices, including without limitation a keyboard, a mouse, a display and one or more disk drives. It is noted that the computing systems 104 may be heterogeneous. Specifically, they may differ from each other in architecture, operating system or other important respects. According to parallel computing terminology used in the art, a computing system 104 may be referred to as a node.

Each computing system 104 includes one or more processors 106. A processor may be any of a wide variety of technological devices known in the art for performing computing operations. It is contemplated that each processor 106 is an integrated circuit. In an embodiment of the present invention, each processor is a general purpose microprocessor configured to execute arbitrary software instructions. In another embodiment of the present invention, each processor is a specialized integrated circuit configured to perform a predefined computing operation.

A processor 106 may be coupled with one or more banks of random access memory 108. It is noted that two or more processors may be coupled with the same bank of random access memory. In fact, doing so is advantageous because the processors may thus communicate via the shared bank of random access memory.

A computing system 104 may include a large number of processors 106. In an embodiment of the present invention, each computing system has eight processors. In another embodiment of the present invention, each computing system has sixteen processors. It is emphasized that FIG. 1 shows each computing system as having two processors solely to simplify the figure.

The processor 106 may execute one or more computing processes 110, 124. The computing processes may be implemented in software, hardware or a combination thereof. For example, a computing process may comprise software instructions which are tightly coupled to a specialized integrated circuit configured specifically to perform a predefined computing operation. The computing processes may comprise computer code written in any of a variety of programming languages known in the art. Such programming languages may include object oriented programming languages such as C++, Java™ or the like. Java is a trademark of Sun Microsystems, Inc., Santa Clara, Calif., United States, in the United States and other countries. Such programming languages may also include conventional procedural programming languages, such as C, FORTRAN or the like.

In an embodiment of the present invention, a computing process 110, 124 comprises instructions stored at the random access memory 108 coupled to the processor 106. These instructions are loaded into and executed at the processor 106. A computing process may additionally manipulate data 112 located at the random access memory 108. A computing process may implement the method of the present invention on a particular processor. Such a process may comprise a predefined computing operation. A computing process may also implement auxiliary functionality required to support the method of the present invention. For example, critical operating system tasks such as process swapping, memory allocation and disk access may be implemented via computing processes which implement operating system functionality. Additionally, the processor 106 may execute computing processes not related to the present invention. For example, the computing system 104 may execute a word processing system comprising one or more computing processes. Because word processing systems known in the art spend most of their time waiting for user input, most of the computing power of the processor 106 is available to a concurrently executing computing process implementing the present invention.

A process 110, 124 may be part of a parallel computing application. The parallel application code may be data parallel, task parallel or single program multiple data (SPMD). In SPMD, the same piece of code executes at multiple processors as different processes. The exemplary parallel computing applications described herein are based on the SPMD paradigm. However, the present invention does not require that the parallel application is based on the SPMD paradigm.

A process 110, 124 included in a parallel application is known in the art as a task. Each such process has a unique identifier known as a task ID. The task ID is generally different from the process ID assigned by the operating system.

Generally, the problem to be solved by the parallel application is decomposed into discrete subparts. Each process 110, 124 or task works on one such subpart. The processes work in parallel. In most cases, the processes need to exchange data and synchronize with each other. Therefore, interprocess communication is essential to most parallel applications. This interprocess communication may include sending and receiving messages. The interprocess communication may be performed according to the Message Passing Interface, or MPI.

The computing systems 104 may be connected to a network 114. The network may be any of a wide variety of systems known in the art for allowing two or more systems to communicate. The network may comprise any of a wide variety of networks such as the Internet, the public switched telephone network (PSTN), local area networks (LAN's) and wide area networks (WAN's). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network may include various topologies and protocols known to those skilled in the art, such as TCP/IP, UDP, and Voice over Internet Protocol (VoIP). The network may comprise direct physical connections, radio waves, microwaves or any combination thereof. Furthermore, the network may include various networking devices known to those skilled in the art, such as routers, switches, bridges, repeaters, etc.

The network 114 may allow any computing system 104 to communicate with any other computing system. The network may tightly couple the computing systems 104 to each other. It is noted that a network used in parallel computing systems is sometimes referred to as a communication fabric.

A computing system 104 may include one or more operating system instances. As used herein, an operating system instance includes an instance of an operating system along with any resources within a computing system managed by the operating system. Such resources may include without limitation processors and memory. Thus, if a computing system includes only one operating system which manages the entire computing system, the operating system instance includes the entire computing system. An OSI may also be referred to as an operating system image.

Thus, if a computing system includes a plurality of OSI's, each OSI may manage a subset of the processors 106 at the computing system. Each OSI may also have memory and other resources allocated specifically thereto. It is noted that when multiple computing processes 110, 124 are managed by different OSI's located at the same computing system, the computing processes generally communicate via a network 114. By contrast, when multiple computing processes are managed by the same OSI, the computing processes may communicate via shared resources managed by the OSI. Such shared resources may include System V shared memory and semaphores.

The system further includes one or more communicators 116. A communicator a group of processes. Thus, the communicator is associated with the plurality of processes comprised thereby. The processes associated with the communicator may be computing processes 110, 124. Such computing processes may have any of the properties described above regarding computing processes in general.

Each process 110, 124 comprised by the communicator 116 has a rank relative to the communicator. The rank is not required to be the same as the task ID of the process. The rank is unique within the communicator. However, a process belonging to multiple communicators may have a different rank relative to each communicator.

A communicator may provide a communication context for the group of processes to communicate. In particular, a communicator may include a unique context number. It is noted that a computing process may be included in more than one communicator. Thus, the communication context advantageously includes mechanisms for ensuring that communication among one group of processes does not interfere with communication among another group of processes in the case where a computing process belongs to both groups of processes.

It is noted that most parallel applications use a limited number of communicators. Moreover, it is uncommon for a process to be involved in multiple collective communications simultaneously executed at multiple communicators.

A collective communication operation is defined on a communicator 116. A collective communication operation is carried out by all participating processes calling the operation. It is contemplated that the participating processes include all of the processes associated with the communicator. A collective communication operation may be implemented by first mapping the operation into a series of point-to-point communication operations. Generally, each such point-to-point communication operation involves two of the participating processes. Then, the point-to-point communication operations are carried out.

The system 102 further includes a memory pool 118. The memory pool may be provided by a communication library or a communication subsystem. The memory pool may be located at a computing system 104. More specifically, the memory pool may be stored at a bank of random access memory 108 located at the computing system.

The memory pool includes one or more early arrival buffers 120. The one or more early arrival buffers may be provided by the MPI library or a communication subsystem. An early arrival buffer may be an area of memory configured to hold a message. An early arrival buffer may have a defined size. In an embodiment of the present invention, each early arrival buffer is 16 kilobytes in size. It is emphasized that FIG. 1 shows the memory pool as having only one early arrival buffer solely in the interest of simplifying the drawing. To the contrary, the memory pool may include a very large number of early arrival buffers.

It is contemplated that if the system 102 includes a plurality of communicators 116, the memory pool 118 is shared among two or more of the communicators. In an embodiment of the present invention, collective communication operations on all communicators included in the system share the single memory pool.

The system further includes an assigning unit 122. The assigning unit is configured to assign one or more tokens to a communicator 116. A token represents an early arrival buffer 120. Thus, each token entitles a process in the communicator to transmit a message to any other process in the communicator via a single early arrival buffer. For example, if 256 tokens are assigned to a communicator, the communicator may transmit messages via at most 256 early arrival buffers simultaneously.

It is emphasized that each of the plurality of processes comprised by a communicator may consume any of the one or more tokens assigned to the communicator. In an embodiment of the present invention, aggregating all processes comprised by the communicator, the processes may access a combined total number of early arrival buffers equal to the number of tokens assigned to the communicator. In another embodiment of the present invention, aggregating all processes comprised by the communicator, the processes may access a combined total number of early arrival buffers equal to the number of tokens assigned to the communicator times the number of processes in the communicator.

In an embodiment of the present invention, a count of the number of tokens assigned to each communicator 116 may be maintained. A count of the number of tokens currently available to each communicator may also be maintained. The counts may differ at a given point in time because consuming a token causes the number of tokens available to the communicator consuming the token to be decreased by one.

In a further embodiment of the present invention, each process 110, 124 comprised by a communicator has a separate count of the number of assigned tokens, the number of available tokens, or both. These counts may be maintained by a library implementing the Message Passing Interface.

The assigning unit 122 may execute at a computing system 104. The assigning unit may be implemented in software, hardware or a combination thereof. The assigning unit may be implemented as one or more computing processes 110. Such computing processes may have any of the properties described above regarding computing processes in general.

It is contemplated that if the system 102 includes a plurality of communicators 116, the assigning unit 122 is shared among two or more of the communicators. In an embodiment of the present invention, all communicators included in the system share a single assigning unit.

A process 110 may send a message 126 to another process 124. It is contemplated that communicating processes 110, 124 are included in the same communicator 116. To send a message, the sending process 110 invokes a sending operation 128 on the message. The receiving process 124 invokes a receiving operation 130 on the message. It is emphasized that the sending operation must be matched by a receiving operation in order for the message to be sent.

A message 126 may be sent eagerly. As used herein, "eagerly" means that an operation to send a message may complete without acknowledgement that the recipient of the message is ready to receive the message. Notably, the operation to send a message may complete even if the corresponding receive operation has not yet been invoked by the recipient of the message. It is noted that a message which is sent eagerly is known as an eager message.

If a message 126 is sent eagerly, and the recipient process 124 has started the receiving operation 130, the eager message may be sent directly to the recipient process. Specifically, the sending operation 128 may cause the eager message to be stored in a receive buffer located at the recipient process 124. The receiving operation may cause the message to be read from the receive buffer. It is emphasized that in this case, sending the eager message does not require an early arrival buffer. Thus, a token is not consumed.

If instead the recipient process 124 has not started the receiving operation 130 to receive the message, the sending operation 128 instead causes the eager message to be stored in an early arrival buffer 120. Thus, the eager message will be available when the recipient process 124 eventually invokes the receiving operation. The receiving operation may cause the message to be read from the early arrival buffer. It is emphasized that in this case, sending the eager message requires an early arrival buffer. Thus, a token is consumed.

It is emphasized that once the message is stored at the early arrival buffer, further involvement by the sending process is no longer required because the receiving process may access the message via the early arrival buffer. This is advantageous because the sending operation may complete even if the receiving operation has not yet completed. Furthermore, a sending operation may be invoked before the corresponding receive operation is invoked. Even in this case, the sending operation may complete because the message is stored at the early arrival buffer and will be accessed when the receiving process invokes a receiving operation on the message.

In the exemplary message transmission outlined above, one early arrival buffer 120 was required to send the message 126 eagerly. It is emphasized that the communicator 116 including the sending process 110 and the receiving process 124 must spend one token in order to access the early arrival buffer. Thus, the communicator must have at least one available token before the sending process may send the message.

Figure 2A:
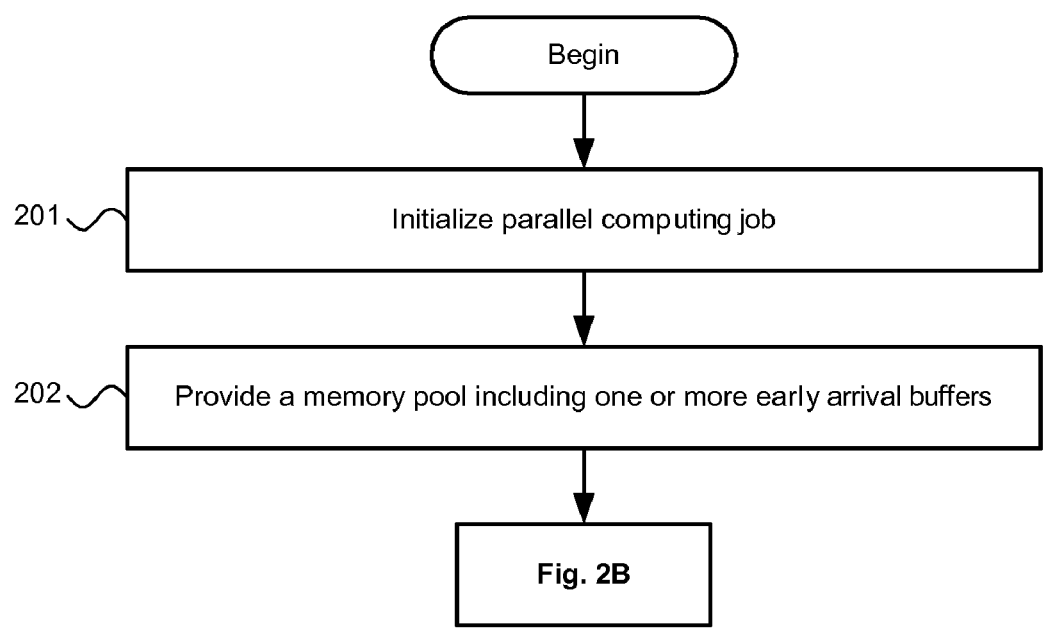
Figure 5A:
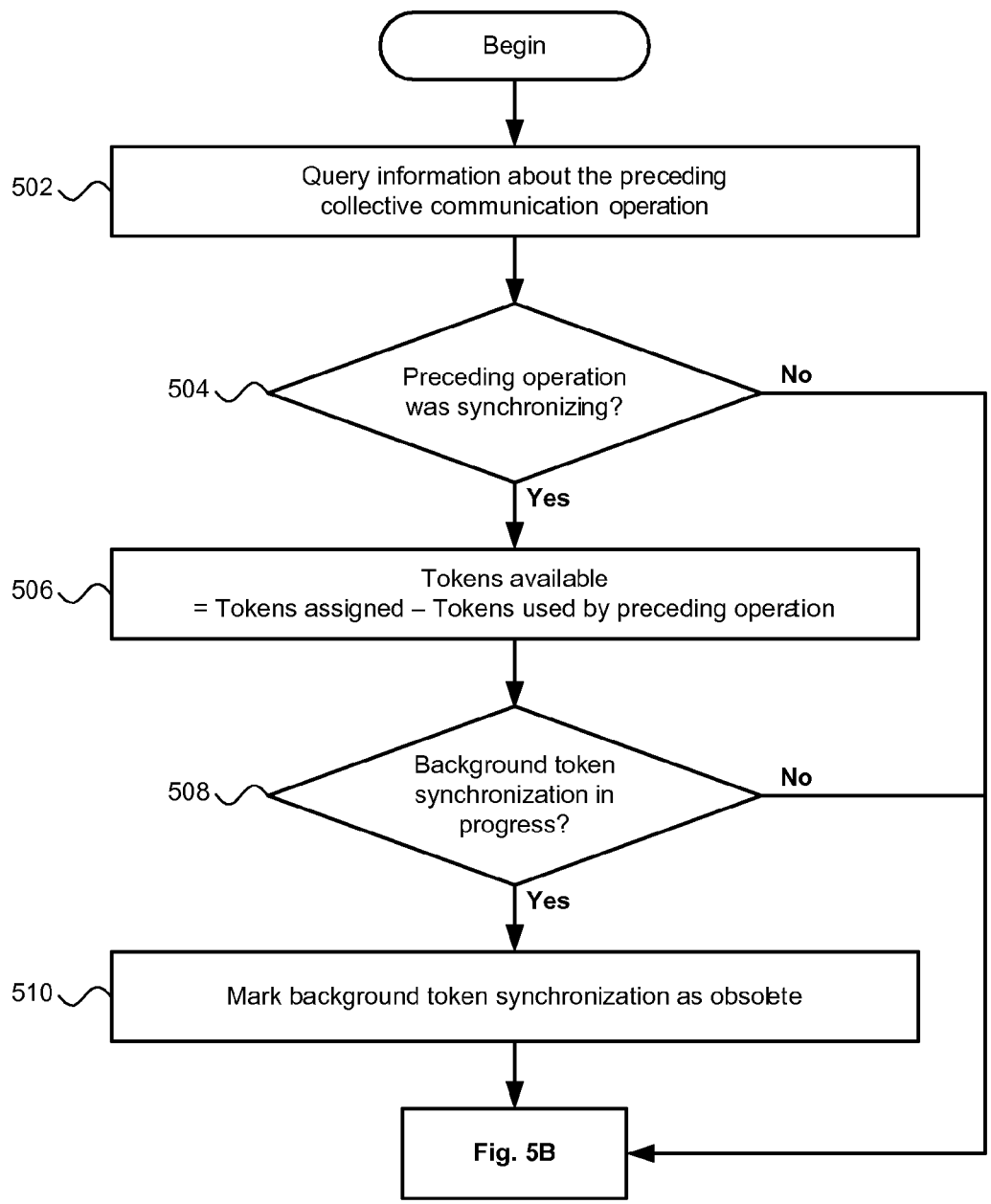
FIG. 5 shows an exemplary flowchart of operations for performing token management according to the present invention.
Figure 5B:
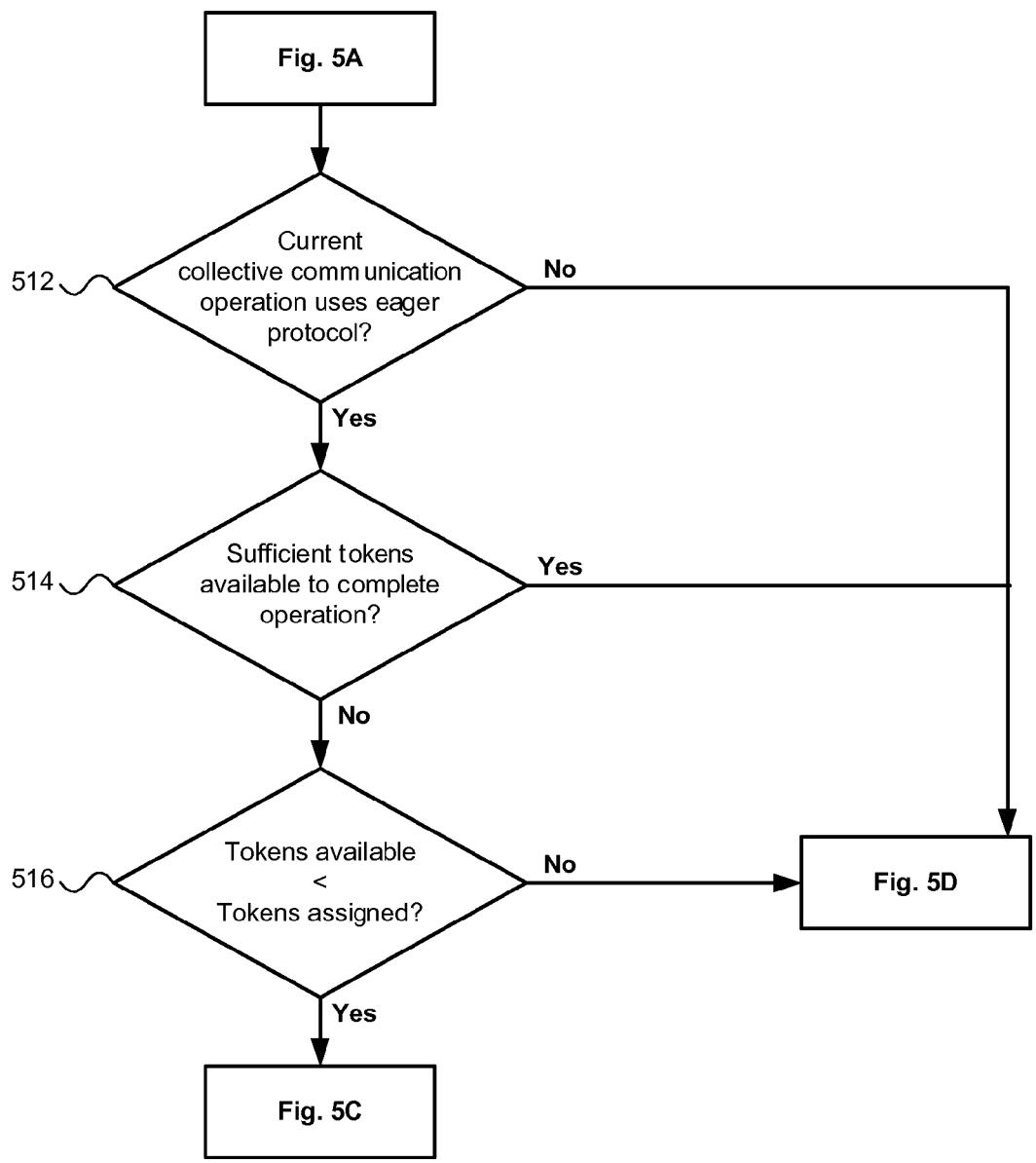
Figure 5C:
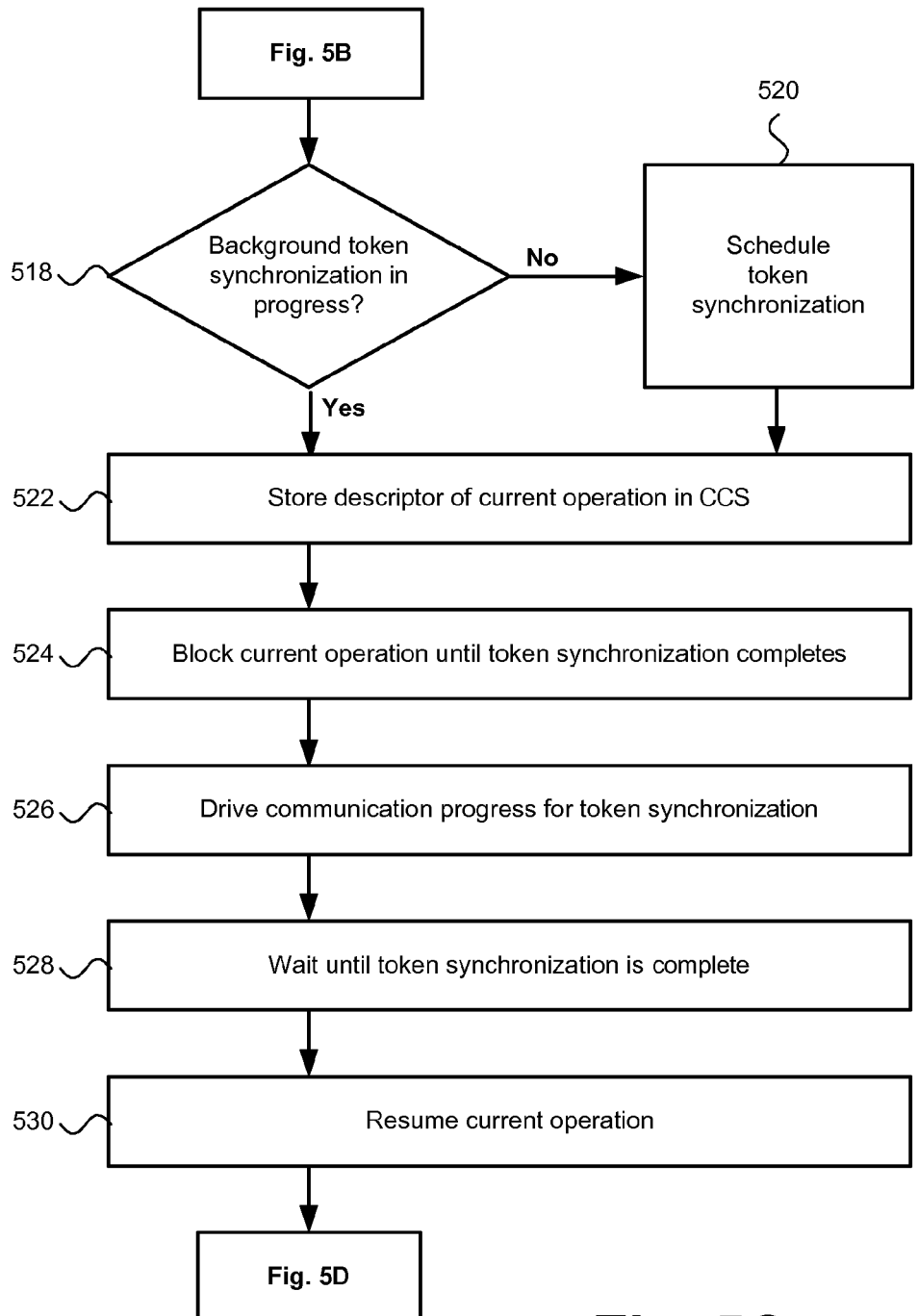
Figure 5D:
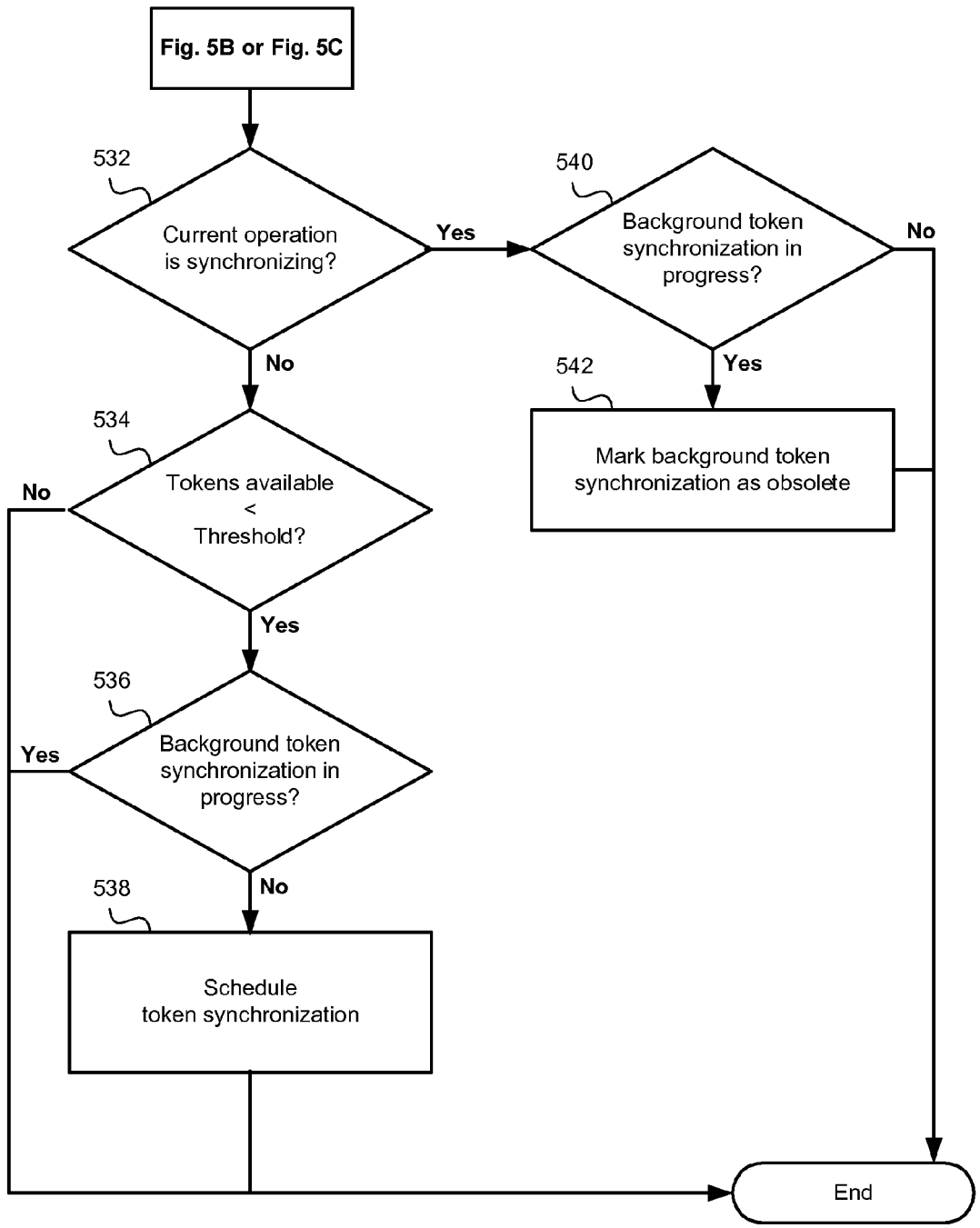

Turning now to FIGS. 2A and 2B, an exemplary flowchart of operations performed by the present invention to facilitate collective communication in a system for parallel computing is demonstrated.

The operations shown in FIGS. 2A and 2B may be performed by a system for performing parallel computing such as the exemplary system shown in FIG. 1. Notably, the system includes a plurality of computing systems. Each of the plurality of computing systems includes one or more processors. The system includes one or more communicators. Each of the one or more communicators comprises a plurality of processes.

FIG. 2A shows an exemplary flowchart of operations performed to prepare to execute a parallel computing job. It is emphasized that the exemplary operations shown in FIG. 2A are performed only once for each parallel computing job, regardless of the number of communicators participating in the parallel computing job.

In an embodiment of the present invention, the exemplary operations shown in FIG. 2A are invoked by a call to the MPI_Init function defined by the Message Passing Interface.

At initializating operation 201, a parallel computing job is initialized. Initializating operation 201 may include any of a variety of subtasks known in the art for preparing to execute a parallel computing job.

In an embodiment of the present invention, initializating operation 201 includes initializing a communication library implementing the Message Passing Interface (MPI) and a communication subsystem. The initialization may further include initializing all necessary data structures to prepare for communication requests. The initialization may further include initializing all necessary data structures to prepare for communication requests. The initialization may further include configuring a communicator whose group consists of all processes participating in the parallel computing job. This communicator may be named MPI_COMM_WORLD. Thus, initializating operation 201 beneficially enables the plurality of processes participating in the parallel computing job to communicate with each other according to MPI.

After initializating operation 201 is completed, control passes to providing operation 202.

At providing operation 202, a memory pool is provided. The memory pool may have any or all of the properties discussed with regard to the memory pool 118 of FIG. 1. Notably, it is contemplated that if the system includes a plurality of communicators, the memory pool is shared among two or more of the communicators. In an embodiment of the present invention, all communicators included in the system share a single memory pool for collective communication operations.

The memory pool is initially seeded with a number of early arrival buffers. As a result, the memory pool includes one or more early arrival buffers. The early arrival buffers may have any or all of the properties discussed with regard to the early arrival buffer 120 of FIG. 1.

After providing operation 202 is completed, control passes to creating operation 204 of FIG. 2B.

FIG. 2B shows an exemplary flowchart of operations performed to execute a parallel computing job. It is emphasized that if a plurality of communicators are participating in the parallel computing job, the exemplary operations shown in FIG. 2B are repeated for each of the plurality of communicators. These sequences of operations may be performed in parallel, as the communicators within the system may communicate independently of each other.

At creating operation 204, a communicator is created. Creating operation 204 may comprise performing an MPI call to create a new communicator. Specifically, each of several processes included in an existing larger communicator may perform the communicator creation call. Creating operation 204 may further include initializing and configuring any data structures internal to MPI, a communication subsystem or both for facilitating communication on the communicator. Creating operation 204 may further include exchanging information among the processes to be included in the communicator. This information exchange may include negotiating a context number shared by all processes included in the communicator.

In an embodiment of the present invention, creating operation 204 comprises invoking a communicator creation operation by each process to be included in the communicator.

The communicator created at creating operation 204 is henceforth one of the one or more communicators included in the system. It is noted that this communicator is hereinafter referred to as the specified communicator in order to distinguish it from other communicators included in the system.

After creating operation 204 is completed, control passes to assigning operation 206.

At assigning operation 206, the assigning unit assigns one or more tokens to the specified communicator included in the one or more communicators. The assigning unit may have any or all of the properties discussed with regard to the assigning unit 122 of FIG. 1.

Each token represents the right to obtain one early arrival buffer from the memory pool. Thus, each token entitles a process in the communicator to transmit a message to any other process in the communicator via a single early arrival buffer. It is emphasized that each of the plurality of processes comprised by the specified communicator may consume any of the one or more tokens assigned to the specified communicator.

The number of tokens assigned to the specified communicator varies according to the number of tasks in the specified communicator and how much memory space can be assigned to the specified communicator. The number of tokens assigned to the specified communicator may be $T=\log P \times L$. In this formula, P is the size of the communicator. Specifically, P is the count of the plurality of processes comprised by the specified communicator. L is an allowed pipeline depth for collective communication operations. In an embodiment of the present invention, L, the allowed pipeline depth, is 16.

It is emphasized that the number of tokens actually assigned to the specified communicator may differ from the result of the formula above. Assigning operation 206 may instead assign to the specified communicator a number of tokens which is calculated according to any of the exemplary algorithms discussed below with regard to the assigning unit 122 of FIG. 4. Moreover, considerations discussed below with regard to the assigning unit 122 of FIG. 4 may cause the number of tokens assigned to the communicator to differ from the result of the formula shown above.

The amount of memory of the buffer pool promised to the specified communicator is $M=T \times S$. In this formula, T is the number of tokens actually assigned to the specified communicator, whether or not the actual number of tokens was calculated by the formula shown above. Furthermore, S is the size of one early arrival buffer. In an embodiment of the invention, S, the size of one early arrival buffer, is 16 kilobytes.

After assigning operation 206 is completed, control passes to allreduce operation 208.

At allreduce operation 208, an allreduce operation is performed to calculate a number of early arrival buffers required by the collective communication operation. As used herein, an allreduce operation may have the same semantic as the MPI ALLREDUCE primitive as defined by the Message Passing Interface specification "MPI: A Message-Passing Interface Standard Version 2.1", Message Passing Interface Forum (Sep. 4, 2008) (see www.mpi-forum.org/docs/) incorporated herein by reference in its entirety. It is contemplated that allreduce operation 208 is performed by all processes included in the specified communicator.

In an embodiment of the present invention, the allreduce operation is carried out as part of the first collective communication call. The allreduce operation calculates the minimum number of tokens assigned to any of the processes included in the communicator. The minimum number of tokens thus calculated may be denoted as $T_{min}$.

As previously noted, a process may belong to multiple communicators. Therefore, the amount of memory available to each process included in a communicator may not be the same for each process. For example, a first process included in the specified communicator may additionally be a member of ten previously instantiated communicators. A second process, also included in the specified communicator, may additionally be a member of twenty previously instantiated communicators. However, the same amount of memory may have been allocated by the MPI library or the communication subsystem for both the first process and the second process. Thus, the second process may have sufficient remaining memory to satisfy the formula listed above. A smaller number of tokens may be assigned to the second process in this case.

It is noted that the allreduce operation does not use an eager protocol. Therefore, allreduce operation 208 does not use any of the tokens assigned to the specified communicator.

After allreduce operation 208 is completed, control passes to determining operation 210.

At determining operation 210, each process determines whether the number of tokens assigned to any process included in the communicator is less than the number of tokens assigned to itself. Thus, determining operation 210 may compare the minimum number of tokens calculated by allreduce operation 208, e.g., $T_{min}$, to the number of tokens assigned at the current process. It is contemplated that determining operation 210 is performed by all processes included in the specified communicator.

If at another member of the communicator, the number of tokens assigned to the communicator is less than the number of tokens assigned at this task, control passes to releasing operation 212. Otherwise, control passes to token management operation 214.

At releasing operation 212, at least one of the tokens assigned to the specified communicator is released. It is emphasized that as a result of determining operation 210, releasing operation 212 is only performed if the number of early arrival buffers assigned to the communicator at another member of the communicator is less than the number of tokens assigned to the specified communicator at this process. It is contemplated that releasing operation 212 is performed by individual processes included in the specified communicator.

In an embodiment of the present invention, releasing operation 212 causes $T-T_{min}$ tokens to be released. Accordingly, $(T-T_{min}) \times S$ bytes of memory are returned to the memory pool.

After releasing operation 212 is completed, control passes to token management operation 214.

At token management operation 214, an analysis is performed to determine whether it is necessary to restore tokens. If it is determined to be necessary, action is taken to restore tokens. Token management operation 214 may include the exemplary sequence of operations shown in FIG. 5, performed for the specified communicator.

Token management operation 214 may be performed after the collective communication operation is invoked but before the collective communication operation begins executing. This advantageously allows token management operation 214 to have information about the identity of the collective communication operation. This information is relevant to whether or not sufficient tokens are available.

After token management operation 214 is completed, control passes to decrementing operation 215.

At decrementing operation 215, a number of tokens available to the specified communicator is decremented.

As with token management operation 214, decrementing operation 215 may be performed after the collective communication operation is invoked but before the collective communication operation begins executing. This advantageously allows token management operation 214 to have information about the identity of the collective communication operation.

Each collective communication operation has a value specific to the collective communication operation. This value may represent the maximum number of early arrival buffers required by the collective communication operation. The value may also represent the maximum number of early arrival buffers required at each process involved in the collective communication operation. For example, for a short message MPI_Bcast or MPI_Scatter algorithm, the value is one. For a short message MPI_Reduce or MPI_Gather algorithm, the number of tokens available is reduced by log N, where N is a number of computing systems or OSI's participating in the collective communication operation. The number of tokens available to the specified communicator is decremented by the value specific to the collective communication operation to be performed.

Decrementing operation 215 may be performed at all processes included in the communicator. This is advantageous if each process included in the communicator maintains its own count of available tokens.

The number of tokens available to the communicator may not be negative. If decrementing operation 215 would result in a negative value, the number of available tokens may instead be unchanged. In this case, the collective communication operation is performed without using an eager protocol. For example, decrementing operation 215 may set a flag which indicates that the collective communication operation is to be performed without using an eager protocol.

After decrementing operation 215 is completed, control passes to collective communication operation 216.

At collective communication operation 216, a collective communication operation is performed on the specified communicator. The collective communication operation may implement an algorithm for collective communication. The collective communication operation may be implemented by translating it into a series of point-to-point communication operations and then executing each point-to-point communication operation. Therefore, the collective communication operation may comprise one or more point-to-point communication operations between a first process and a second process. The first process and the second process are associated with the specified communicator. However, the first process and the second process need not be the same for each of the point-to-point communication operations. To the contrary, it is contemplated that a wide variety of pairings of processes communicate with each other via the point-to-point communication operations. In many collective communication operations, all processes associated with the specified communicator engage in point-to-point communication operations.

A collective communication operation 216 may be invoked by all processes included in a communicator performing the same call to execute the collective communication operation. The call may specify the ID of the communicator. This beneficially allows a communication system implementing the MPI library to be aware of other participants in the collective communication operation and to know the context number of the collective communication operation.

A collective communication operation may be performed eagerly. Specifically, each point-to-point communication operation may be performed eagerly provided that enough tokens are available to the communicator to do so.

Sending messages eagerly consumes tokens. Thus, the collective communication operation consumes a number of tokens at every participating process. The number of tokens consumed may be the same across all processes associated with the communicator. Overall, a collective communication operation generally consumes a predefined number of tokens.

As discussed in more detail below, any or all of the point-to-point communication operations may include the exemplary sequence of operations shown in FIG. 3. Thus, the exemplary sequence of operations shown in FIG. 3 is repeated once for each such point-to-point communication operation. It is contemplated that at least one of the point-to-point communication operations comprises the exemplary sequence of operations shown in FIG. 3.

The point-to-point communication operations may be performed in parallel. The point-to-point communication operations may also be performed sequentially. It is even possible for the result of one point-to-point communication operation to influence the result of a subsequent point-to-point communication operation. It is also possible for some point-to-point communication operations to be performed in parallel with each other and other point-to-point communication operations to be performed sequentially.

In many algorithms for collective communication known in the art, processes are organized into tree-like structures for communication purposes. In collective communication operations employing these algorithms, any particular process is only required to communicate with O(log P) processes, where P is the total number of processes associated with the communicator.

After collective communication operation 216 is completed, control passes to determining operation 218.

At determining operation 218, it is determined whether the specified communicator has at least one additional collective communication operation to execute. If it is determined that the specified communicator has at least one additional collective communication operation to execute, control passes to token management operation 214, at which the next collective communication operation is executed. It is emphasized that the tokens assigned to the specified communicator are reused for the second and subsequent collective communication operations executed at the specified communicator.

If it is determined that the specified communicator has no further collective communication operations to execute, processing terminates for the specified communicator. As previously noted, a system may include a plurality of communicators processing in parallel. Processing may continue for other communicators within the system even if processing terminates for the specified communicator.

Turning now to FIG. 3, an exemplary flowchart of operations performed by the present invention to perform a point-to-point communication operation is shown.

The point-to-point communication operation is part of a collective communication operation, such as the exemplary collective communication operation 216 of FIG. 2. The collective communication operation is performed using the specified communicator discussed above regarding FIG. 2. As previously discussed, the point-to-point communication operation may be executed in parallel with other point-to-point communication operations included in the same collective communication operation. The point-to-point communication operation may also be executed sequentially compared to other point-to-point communication operations included in the same collective communication operation. Nonetheless, the exemplary flowchart of operations shown in FIG. 3 focuses on a single point-to-point communication operation.

The point-to-point communication operation involves two processes. In the point-to-point communication, a first process sends a message to a second process. Both the first process and the second process are comprised by the communicator which is performing the collective communication operation. The exemplary flowchart of operations shown in FIG. 3 includes operations performed by both the first process and the second process.

The exemplary operations shown in FIG. 3 may be performed in software, in hardware or a combination thereof.

At determining operation 302, it is determined whether the size of the message is larger than the size of an early arrival buffer. Determining operation 302 may be performed by the first process. It is contemplated that an early arrival buffer has a fixed size. Thus, if the message is larger than the early arrival buffer, the message cannot be sent eagerly.

If the size of the message is larger than the size of an early arrival buffer, control passes to waiting operation 320. In this case, the message is sent to the second process without using an eager protocol. If the message can fit in an early arrival buffer, control passes to determining operation 304.

At determining operation 304, it is determined whether the specified communicator has sufficient tokens available to send a message eagerly. Determining operation 304 may be performed by the first process.

Requesting an early arrival buffer requires that one token is available to the specified communicator. If the specified communicator has no available tokens, an early arrival buffer may not be provided to the specified communicator. This is problematic because the exemplary sequence of operations beginning with sending operation 306 for eagerly sending a message requires the early arrival buffer.

In an embodiment of the present invention, if determining operation 215 decremented the number of available tokens as described above, it is determined that sufficient tokens are available to send a message eagerly. If instead determining operation 215 did not decrement the number of available tokens (e.g., because the number of available tokens would be negative as a result), it is determined that sufficient tokens are not available to send a message eagerly.

In another embodiment of the present invention, determining operation 215 sets a flag which indicates that the collective communication operation is to be performed without using an eager protocol. If this flag is not set, it is determined that sufficient tokens are available to send a message eagerly. If this flag is set, it is determined that sufficient tokens are not available to send a message eagerly.

In another embodiment of the present invention, if the specified communicator has at least one token available, it is determined that sufficient tokens are available to send a message eagerly. Otherwise, it is determined that sufficient tokens are not available to send a message eagerly. It is noted that this embodiment requires decreasing the number of available tokens by one at each iteration of requesting operation 306 as described below.

In an embodiment of the present invention as shown in FIG. 3, if the specified communicator has sufficient tokens available to send a message eagerly, control passes to sending operation 306. Thus, the message is sent eagerly. If the specified communicator does not have sufficient tokens available to send a message eagerly, control passes to waiting operation 320. Thus, the message is sent to the second process without using an eager protocol.

In another embodiment of the present invention, the point-to-point communication operation may block until sufficient tokens are available to the specified communicator to send a message eagerly. Once this condition exists, processing continues with sending operation 306.

It is emphasized that the exemplary sequence of operations beginning with sending operation 306 causes the message to be sent eagerly.

At sending operation 306, a message is sent eagerly from the first process. Sending operation 306 may comprise defining the data located at the first process which is to be transmitted. Sending operation 306 may further comprise specifying the identity of the second process. The identity may be specified by specifying the context number of the communicator and the rank of the second process relative to the communicator. Based on this information, the task ID of the second process can be determined. Furthermore, context can be determined.

While the message sent in the exemplary point-to-point communication operation shown in FIG. 3 has only one recipient, the number of recipients is not limited to one. Specifically, sending operation 306 may send the message to a plurality of recipients simultaneously. In particular, the message may be sent to a defined subgroup of processes. If each recipient of the message requires a distinct early arrival buffer, it is contemplated that one token is consumed for each such early arrival buffer.

Sending operation 306 may be performed using interfaces for sending defined by the Message Passing Interface. The actual transmission of the message may be performed by a communication library or subsystem which implements the sending operation. The actual transmission of the message may also be performed by hardware. In this case, the tasks performed by the first process may include invoking sending operation 306, specifying the identity of the second process and defining the data to be transmitted.

Sending operation 306 is completed without acknowledgment that the recipient of the message is ready to receive the message. This is possible because in the event that the second process is not ready to receive the message, the message can be stored in an early arrival buffer. In this case, after sending operation 306 completes, the second process can receive the message via the early arrival buffer. Therefore, further involvement by the first process is not required for the message to be successfully received.

As a result, receiving operation 316 need not be performed concurrently with or promptly following sending operation 306. To the contrary, sending operation 306 may be performed and may complete before receiving operation 316 is invoked. It is advantageous to allow for this possibility because the first process may send the message before the second process is ready to process the message. It is also possible, although not required, for sending operation 306 and receiving operation 316 to overlap in time. The only restriction on when receiving operation 316 may be performed, relative to sending operation 306, is that receiving operation 316 clearly cannot successfully receive the message before it has been sent by sending operation 306.

It is noted that for small amounts of data, ensuring that the receive operation has been posted before moving the data from the first process to the second process is expensive in terms of resources compared to the actual cost of moving the data. These resources include both time and memory. Specifically, a control message must be sent from the second process to the first process to indicate that the second process is ready to receive the message. The message is required to contain specific information to be transmitted correctly. In some cases, the control message may be larger than the data message itself. Moreover, memory space is required to assemble and process the control message. Sending the message eagerly avoids the need to ensure that the receive operation has been posted. Therefore, sending the message eagerly beneficially conserves resources.

It is further noted that the Message Passing Interface standard requires that if an eager protocol is used, an implementation thereof cannot fail due to insufficient resources. Instead, the implementation is required to have functionality to throttle and to switch to other protocols.

At determining operation 308, it is determined whether the recipient of the message is ready to receive the message. Determining operation 308 may be performed by the first process.

Determining operation 308 may comprise determining whether the second process has invoked a receive operation configured to receive the message. In an embodiment of the present invention, the invocation of the receive operation can be detected because the receive operation comprises sending an acknowledgement to the first process to indicate that the second process is ready to receive the message. Determining operation 308 may determine that the second process has invoked a receive operation configured to receive the message if and only if this acknowledgement has been received.

The acknowledgement may include a declaration of a location within the memory space of the second process to which the message should be written. This location may be referred to as a receive buffer, a user receive buffer or a sink buffer.

If the recipient of the message is ready to receive the message, control passes to storing operation 324. In this case, the message is sent to the second process without using an early arrival buffer. If the recipient of the message is not ready to receive the message, control passes to requesting operation 310.

At requesting operation 310, an early arrival buffer is requested. An early arrival buffer may have any or all of the properties discussed with regard to the early arrival buffer of FIG. 1. Requesting operation 310 may be performed by the first process, the second process, or both.

The early arrival buffer is included in a memory pool. The memory pool may have any or all of the properties discussed with regard to the early arrival buffer of FIG. 1.

Requesting the early arrival buffer requires consuming at least one token. In an embodiment of the present invention, the number of tokens consumed to obtain a single early arrival buffer is one. Thus, the number of tokens available to the specified communicator is reduced by one. This is necessary because once the early arrival buffer is requested, it cannot be used by another communicator until it is freed.

Consuming a token may be achieved by any action causing the number of available tokens to be decreased by at least the number of early arrival buffers used by the collective communication operation. Thus, in an embodiment of the present invention, decrementing operation 215 of FIG. 2B causes the number of available tokens to be decremented by at least the number of early arrival buffers used by the collective communication operation. Accordingly, the number of available tokens is unchanged by requesting operation 310.

In another embodiment of the present invention, consuming a token is performed by decreasing the number of available tokens by one in response to the request for the early arrival buffer.

If the memory pool does not have any available early arrival buffers, additional memory may be allocated and added to the memory pool. It is contemplated that this condition only occurs if all of the early arrival buffers in the memory pool are being used by concurrent collective communication operations on multiple communicators. Further details of the memory management of the memory pool are discussed below with regard to FIG. 4.

It is emphasized that the number of tokens available to a communicator is distinct from the number of tokens assigned to the communicator. The number of tokens assigned to a communicator is generally fixed, although releasing operation 212 of FIG. 2 reduces this value. By contrast, the number of tokens available to a communicator is variable and may range from zero to the number of tokens assigned to the communicator. Tokens which have been consumed may be made available again by methods such as those shown in FIGS. 5 and 6.

After requesting operation 310 is completed, control passes to receiving operation 312.

At receiving operation 312, the early arrival buffer requested at requesting operation 310 is received. Receiving operation 310 may be performed by the first process, the second process, or both. It is emphasized that the early arrival buffer is received after consuming the at least one token. After receiving operation 312 is completed, control passes to storing operation 314.

At storing operation 314, the message is stored at the early arrival buffer received at receiving operation 312. It is emphasized that as a result, the message is sent eagerly from the first process via the early arrival buffer. After storing operation 314 is completed, control passes to receiving operation 316.

At receiving operation 316, the message is received at the second process via the early arrival buffer. Receiving operation 316 may comprise declaring a location within the memory space of the second process to which the message should be written. This location may be referred to as a receive buffer, a user receive buffer or a sink buffer. Receiving operation 316 may further comprise moving the message from the early arrival buffer to the receive buffer at the second process.

Receiving operation 316 may further comprise specifying the identity of the first process. The identity may be specified by specifying the context number of the communicator and the rank of the first process relative to the communicator. Based on this information, the task ID of the first process can be determined. Furthermore, context can be determined.

Receiving operation 316 may be performed using interfaces for receiving defined by the Message Passing Interface. The actual transmission of the message may be performed by a communication library or subsystem which implements the receiving operation. The actual transmission of the message may also be performed by hardware. In this case, the tasks performed by the second process may include invoking receiving operation 316, specifying the identity of the first process and defining the receive buffer.

After receiving operation 316 is completed, control passes to freeing operation 318.

At freeing operation 318, the early arrival buffer is returned to a list of free early arrival buffers. As a result, the early arrival buffer is available to be reused by either the specified communicator or another communicator. However, reuse of the freed early arrival buffer requires consuming another token.

It is noted that freeing operation 318 may not automatically cause the token consumed to obtain the early arrival buffer to be available. Nonetheless, the token is no longer in use, as the early arrival buffer it was consumed to obtain is no longer in use. Therefore, at any point in time after freeing operation 318 completes, the consumed token may be made available according to the exemplary sequence of operations shown in FIGS. 5 and 6.

After freeing operation 318 is completed, the point-to-point communication operation is complete. In most cases, the second process performs computational operations on the received message. Such computational operations may additionally operate on other messages received in point-to-point communication operations with processes other than the first process.

It is emphasized that the exemplary sequence of operations beginning with waiting operation 320 causes the message to be sent without using an eager protocol.

At waiting operation 320, an idle state occurs until an acknowledgement is received that the second process has invoked a receive operation configured to receive the message. The acknowledgement may be similar to the acknowledgement described above in regards to determining operation 308. After waiting operation 320 is completed, control passes to sending operation 322.

At sending operation 322, a message is sent from the first process to the second process. Sending operation 322 may be similar to sending operation 306. After sending operation 322 is completed, control passes to storing operation 324.

At storing operation 324, the message is stored at a receive buffer located at the second process. The location of the receive buffer may have been specified by the acknowledgement received at waiting operation 320 or determining operation 308. After storing operation 324 is completed, control passes to receiving operation 326.

At receiving operation 326, the message is received at the second process via the receive buffer. Because the message is not stored in an early arrival buffer, receiving operation 326 does not include moving the message from the early arrival buffer to the receive buffer at the second process. Otherwise, receiving operation 326 may be similar to receiving operation 316.

In the exemplary flowchart of operations shown in FIG. 3, receiving operation 326 is executed after sending operation 322. If instead receiving operation 326 is executed before sending operation 322, receiving operation 326 may include sending the acknowledgement discussed above regarding waiting operation 320 and determining operation 308.

After receiving operation 326 is completed, the point-to-point communication operation is complete. The second process performs computational operations on the received message as discussed above.

As previously noted, the exemplary operations shown in FIG. 3 may be repeated for any or all of the point-to-point communication operations included in the collective communication operation. Therefore, a number of tokens may be consumed by each process participating in the collective communication operation. Thus, the number of tokens available to the communicator executing the collective communication operation is reduced by the same number at all processes participating in the collective communication operation.

FIG. 4 illustrates an exemplary system for facilitating collective communication for parallel computing as contemplated by the present invention.

The exemplary system 402 for facilitating collective communication is contained within a system for performing parallel computing such as the exemplary system of FIG. 1. In many cases, FIG. 4 provides additional detail about structures introduced in FIG. 1.

The system 402 includes one or more communicators 116. A communicator may have any or all of the properties discussed with regard to the one or more communicators of FIG. 1.

Each of the one or more communicators 116 comprises a plurality of processes 110, 124. A process may have any or all of the properties discussed with regard to the computing processes of FIG. 1. Notably, a process may execute at a processor such as any of the exemplary processors 106 of FIG. 1. A processor may be part of a computing system such as any of the exemplary computing systems 104 of FIG. 1.

As previously discussed, a computing system may include one or more operating system instances, or OSI's. Thus, subsequent discussion focuses on OSI's instead of computing systems. In the case where a computing system includes only one OSI, the OSI generally controls the entire computing system. Thus, the distinction is of minimal importance to the present discussion. In the case where a computing system includes a plurality of OSI's, the OSI's are logically separate. Thus, the OSI's should be considered as separate entities despite being hosted at the same physical system.

In an embodiment of the present invention, each communicator 116 is associated with a collective communication operations control structure (CCS) 404. The CCS may be created and maintained by the Message Passing Interface. The CCS contains necessary information regarding the communicator. Notably, the CCS includes a communication context and identifiers of the group of the processes. To facilitate easy access, the CCS may additionally include data about the communicator with which it is associated.

In an embodiment of the present invention, MPI maintains an array of data structures at each process. The array includes one element for each communicator in which the process is included. The element includes information regarding the communicator. Such information may include without limitation a context identifier, a count of the assigned tokens and a count of the available tokens, a pointer to the CCS associated with the communicator, and pointers to other data structures.

The CCS may be implemented as a data structure including at least the following fields related to eager protocol token and buffer management. It is noted that for this data structure and for subsequent data structures, the type is expressed as a data type in terms of the syntax of the "C" programming language. In an embodiment of the present invention, computer code implementing the present invention is written in the "C" programming language. In another embodiment of the present invention, computer code implementing the present invention is written in the "C++" programming language. It is emphasized that the present invention is not required to be implemented in the "C" or "C++" programming languages. Computer code implementing the present invention may be written in any of a variety of programming languages known in the art. These programming languages may utilize any of a number of programming paradigms known in the art, including without limitation object-oriented programming, procedural programming, and assembly and microcode languages.

The field "token_asgn", of type int, is the number of tokens assigned to the communicator. Those skilled in the art will appreciate that the data type "int" is an integer value.

The field "token_avai", of type int, is the currently available number of tokens.

The field "token_sync_seq", of type int, is the sequence number for the next token synchronization operation. Additional details about token synchronization are provided with regard to FIGS. 5 and 6.

The field "cur_token_sync", of type int, is the sequence number of the current active token synchronization operation.

The field "token_sync_list", of type "_token_sync_desc_t *", is a list of token synchronization operations which are in progress. Those skilled in the art will appreciate that this data type is a pointer to a user defined data type named "_token_sync_desc_t". This user defined type is the token synchronization operations descriptor which is discussed below. Moreover, there may be more than one token synchronization operations descriptor at a given point in time. The pointer thus points to the first element of a linked list of token synchronization operations descriptors. If there are no token synchronization operations in progress, this field may have the value Null. Null is a programming construct which, in the context of a linked list, indicates that the list has no elements.

The field "ea_buf_list", of type "_cc_ea_buf_t *", is a list of early arrival buffers containing eager messages. Those skilled in the art will appreciate that this data type is a pointer to a user defined data type named "_cc_ea_buf_t". This user defined type is the early arrival buffer which is discussed below. The pointer thus points to the first element of a linked list of early arrival buffers containing eager messages. If there are no early arrival buffers containing eager messages, this field may have the value Null.

The field "cc_op_desc", of type "_cc_op_desc_t *", is a pointer to the collective communication operation descriptor of a collective communication operation being performed on the communicator. The user defined data type for the collective communication operation descriptor is discussed below.

The CCS may include one or more token synchronization operations descriptors. For each token synchronization which is in progress, one token synchronization operations descriptor is instantiated. A token synchronization operations descriptor contains all information about its corresponding token synchronization.

A token synchronization operations descriptor may be implemented as a user defined data type named "_token_sync_desc_t". This data type may be implemented as a data structure including at least the following fields.

The field "sync_seq", of type int, is the sequence number of the token synchronization operation. It is contemplated that each token synchronization operation has a unique sequence number.

The field "tokens_to_restore", of type int, is the number of tokens that can be restored once this operation is complete.

The field "cc_op_desc", of type "_cc_op_desc_t *", is a pointer to the collective communication operation descriptor of the collective communication operation for the token synchronization. The token synchronization is itself a collective communication operation. Therefore, the token synchronization has a collective communication operation descriptor. This field accordingly contains a pointer to this structure.

The field "next", of type "_token_sync_desc_t *", is a pointer to the next descriptor in the list. If the current descriptor is the last descriptor in the list, this field may have the value Null.

A collective communication operation descriptor contains all calling parameters of the collective communication operation. Saving the calling parameters of a collective communication operation which was suspended due to an insufficient number of available tokens advantageously facilitates resuming the collective communication operation once a token synchronization operation has completed. Completion of the token synchronization operation may make enough tokens available for the collective communication operation to be performed eagerly. The collective communication operation descriptor may be implemented as a user defined data type named "_cc_op_desc_t".

The system 402 further includes a memory management unit 406. The memory management unit manages memory used to send messages eagerly. The memory management unit may be implemented at a computing system such as any of the exemplary computing systems 104 of FIG. 1. The memory management unit may comprise computer code written in any of a variety of programming languages known in the art. Such programming languages may include object oriented programming languages such as C++, Java™ or the like. Java is a trademark of Sun Microsystems, Inc., Santa Clara, Calif., United States, in the United States and other countries. Such programming languages may also include conventional procedural programming languages, such as C, FORTRAN or the like.

The memory management unit 406 comprises a memory pool 118. The memory pool may have any or all of the properties discussed with regard to the memory pool of FIG. 1. It is contemplated that if the system includes a plurality of communicators, the memory pool is shared among two or more of the communicators. In an embodiment of the present invention, all communicators included in the system share a single memory pool.

The memory pool 118 includes one or more early arrival buffers 120. An early arrival buffer may have any or all of the properties discussed with regard to the early arrival buffer of FIG. 1.

The memory pool 118, the early arrival buffers 120 or both may be managed by a communication subsystem. The communication subsystem may comprise a library implementing the Message Passing Interface.

The memory pool 118 may be implemented as a data structure including at least the following fields.

The field "total_mem", of type long, is the upper bound of the size of the memory pool. Those skilled in the art will appreciate that the data type "long" is an integer value which may hold large values.

The field "mem_alloc", of type long, is the current size of the memory pool.

The field "mem_asgn", of type long, is the amount of the memory within the memory pool which has been promised to any communicator.

The field "free_list", of type "_cc_ea_buf_t *", is a list of early arrival buffers in the memory pool which are currently free. The pointer points to the first element of a linked list of early arrival buffers. If no early arrival buffers are currently free, this field may have the value Null.

In an embodiment of the present invention, total_mem is 36 megabytes.

An early arrival buffer 120 may be implemented as a user defined data type named "_cc_ea_buf_t". This user defined data type may be implemented as a data structure including at least the following fields:

The field "buf" is a pointer to a buffer where an eager message may be stored. In an embodiment of the present invention, the buffer is 16 kilobytes in size.

The field "next", of type "_cc_ea_buf_t *", which is a pointer to the next early arrival buffer in a linked list of early arrival buffers. If the current early arrival buffer is the last early arrival buffer in the list, this field may have the value Null.

Any of the fields above representing amounts of memory may be expressed in bytes. For example, total_mem could be expressed as the value 37748736. Any of the fields representing amounts of memory may also be expressed in terms of a different word size suitable for a given implementation.

As noted above regarding providing operation 202 of FIG. 2, the memory pool 118 is initially seeded with a number of early arrival buffers 120. In an embodiment of the present invention, the amount of memory initially assigned to the memory pool is a fraction of the value of total_mem.

In an embodiment of the present invention, assigning a number of tokens to a communicator does not automatically cause the allocation of an amount of memory sufficient to instantiate the corresponding number of early arrival buffers. Accordingly, the number of tokens assigned to each communicator 116, summed across all communicators included in the system 402, may exceed the number of early arrival buffers for which memory has been allocated. As a result, even if a communicator is validly consuming a token to request an early arrival buffer, there may be no early arrival buffers available. This condition can be detected by determining whether the value of the free_list field equals Null. In this case, another fraction of total_mem is allocated. Early arrival buffers are instantiated within the newly allocated memory. The newly instantiated early arrival buffers are added to the free_list linked list.

The total amount of memory allocated to the memory pool 118 may be subject to a user-tunable upper bound. This upper bound is determined by the value of total_mem. Thus, allocating additional memory to the memory pool as described above occurs only if the current size of the memory pool is less than the upper bound. Specifically, memory is only allocated if the condition, mem_alloc<total_mem, is True. It is contemplated that, for reasons discussed below, the total number of assigned tokens across all communicators never exceeds the number of early arrival buffers 120 which can be instantiated if the maximum amount of memory is allocated.

In an embodiment of the present invention, the total amount of memory allocated to the memory pool is never decreased.

Generally, on any request by a collective communication operation for an early arrival buffer 120, the early arrival buffer at the head of the free_list linked list is removed from the list and returned to the collective communication operation. Such a request may be performed during requesting operation 310 of FIG. 3. When used to send an eager message, the returned early arrival buffer may be added to the ea_buf_list linked list of the CCS as discussed above.

Conversely, when an early arrival buffer is freed, the returned buffer is prepended to the free_list linked list. This may occur during freeing operation 318 of FIG. 3. The freed early arrival buffer is no longer included in the ea_buf_list linked list of the CCS as discussed above.

Thus, at any given point in time, an early arrival buffer 120 is normally included in either the free_list of the memory pool 118 or on an early arrival buffer list, namely ea_buf_list, of the CCS of a specific communicator.

The memory management unit 406 comprises an assigning unit 122. The assigning unit may have any or all of the properties discussed with regard to the assigning unit of FIG. 1.

The assigning unit is configured to assign one or more tokens to a specified communicator included in the one or more communicators 116. Each of the plurality of processes comprised by the specified communicator may consume any of the one or more tokens assigned to the specified communicator. As a result, all processes associated with the specified communicator have access to the same number of tokens. This is advantageous because in parallel applications, it is common for each process to communicate with only a small subset of the other processes associated with a communicator in most cases. Assigning tokens to communicators allows the tokens to be efficiently used by the pairs of processes which interact with each other in practice. By contrast, if a token were assigned specifically to a pair of processes which never communicates in practice, the token would never be used. Clearly, this is inefficient.

In an embodiment of the present invention, each process included in the communicator records the number of assigned tokens in a token counter which is maintained at the process. It is noted that a collective communication operation on a communicator, if being carried out "eagerly", may need up to a given number of early arrival buffers at any process included in the communicator. For example, an exemplary collective communication operation may require five early arrival buffers at any process included in the communicator to be performed eagerly. This exemplary collective communication operation requires five tokens to be performed eagerly. When a collective communication operation is called on a process, MPI may check how many tokens the collective communication operation requires and how many tokens are still available for the communicator. By comparing these two numbers, the MPI library can determine whether a sufficient number of early arrival buffers exist at any member of the communicator for the collective communication operation to be performed eagerly.

Moreover, it is contemplated that neither the system 402 nor the communication library or subsystem implementing the eager protocol has a priori knowledge of the communication patterns between the different processes associated with a communicator. Under this assumption, it is impossible to know how many tokens should be assigned to each pair of processes. Assigning tokens to a communicator so that the tokens may be employed by any pair of processes associated with the communicator beneficially avoids the need to have a priori knowledge regarding communication patterns.

The assigning unit 122 may assign T=log N×L tokens to the specified communicator 116. In this formula, N is the size of the communicator. Specifically, N may be a count of all computing systems executing the plurality of processes associated with the specified communicator. L is an allowed pipeline depth for collective communication operations. In an embodiment of the present invention, L, the allowed pipeline depth, is 16.

The amount of memory of the buffer pool promised to the specified communicator is M=T×S. In this formula, T is the number of tokens actually assigned to the specified communicator, whether or not the actual number of tokens was calculated by the formula shown above. Furthermore, S is the size of one early arrival buffer. In an embodiment of the invention, S, the size of one early arrival buffer, is 16 kilobytes. mem_asgn is increased by M.

In an embodiment of the present invention, a communicator 116 is allocated at most half of the difference between the amount of memory promised to a communicator and the upper bound of the size of the memory pool 118. Thus, if M>((total_mem−mem_asgn)/2), then M is reduced to ((total_mem−mem_asgn)/2). If the resulting value of M is not an integral multiple of the size of an early arrival buffer, M may be reduced to the highest integral multiple of the size of an early arrival buffer which is less than the value of M as calculated above. It is contemplated that it is impossible to allocate a fraction of an early arrival buffer. In this case, T is decreased in proportion to the change in M so that the equations above still hold. It is noted that adjusting T according to this algorithm ensures that the total number of assigned tokens across all communicators never exceeds the number of early arrival buffers 120 which can be instantiated if the maximum amount of memory is allocated.

It is noted that this algorithm increases the chance that any communicator requiring tokens will receive at least some tokens, even if the amount of available memory is low. This is beneficial because if no tokens can be assigned to a communicator, the communicator cannot send and receive messages according to an eager protocol.

As discussed above, all reduce operation 208, determining operation 210 and releasing operation 212 of FIG. 2 may release tokens assigned to the specified communicator if it is determined if the number of early arrival buffers required by the collective communication operation is less than the number of tokens assigned to the specified communicator. In this case, T is decreased by the number of tokens released. M is decreased proportionally to the change in T so that the equations above still hold. mem_asgn is adjusted relative to the change in M. Furthermore, L is changed so that the equations above still hold. Specifically, L is adjusted based on $T_{min}$ and N.

It is noted that this algorithm normally causes the amount of memory allocated to a communicator for collective communication operations using an eager protocol to be O(log N) in size.

Many collective communication algorithms known in the art pass short messages along binary- or binomial-type spanning trees. For example, in short message MPI_Reduce, processes that are leaves of such a tree structure return from the collective communication call earlier than those processes which are closer to the root of the tree. Leaf processes can therefore enter the next collective communication call while the processes which are closer to the root of the tree are still executing the current call. When an application makes consecutive non-synchronous collective communication calls, part of the communication cost of consecutive calls can be overlapped because some processes may be several calls ahead of other processes when collective communication calls are pipelined in this manner. For a communicator consisting of P processes, a pipeline having a depth of log P is sufficient for all processes to be involved in non-synchronous collective communication operations. For example, if the communicator includes one million processes, a depth of 20 is sufficient.

However, processes executing at the same OSI generally communicate via shared memory. Therefore, the depth can be reduced further to log N, where N is the total number of OSI executing the processes associated with the communicator. For example, if the one million processes are being executed at 65,536 OSI, a depth of 16 is sufficient.

For this reason, a count of the one or more tokens assigned to the specified communicator may be proportional to a logarithm of a count of all operating system instances executing the plurality of processes associated with the specified communicator. For the exemplary formula described above wherein T=log N×L tokens are assigned to a communicator, this property clearly holds.

Moreover, a delayed process can receive log N early arrival messages in a binary or binomial tree algorithm as described above. In a worst case scenario wherein the delayed process is at the head of the pipeline while other processes have reached the end of the pipeline, the delayed process can receive log N×log N or $(\log N)^2$ eager messages. Sending these messages eagerly requires $(\log N)^2$ early arrival buffers. For example, if 65,536 OSI are executing the processes and the depth is 16, N=65,536 and therefore 256 early arrival buffers are required.

For this reason, a count of the one or more tokens assigned to the specified communicator may be proportional to a square of a logarithm of a count of all operating system instances executing the plurality of processes associated with the specified communicator.

In an embodiment of the present invention, a communicator is no case assigned more than 256 tokens for early arrival buffers. Thus, if the exemplary formulae and rules calculate that more than 256 tokens should be assigned to a communicator, only 256 tokens are assigned to the communicator.

It is contemplated that less than 256 tokens are assigned to a communicator in most cases. For example, consider an 8192-process parallel job executing on a system wherein 8 processes execute at each of 1024 OSI's. Thus, the number of tokens assigned may be calculated as $(\log N)^2$, where N equals 1024. According to this formula, 100 tokens are assigned to the communicator coordinating the exemplary parallel job.

As another example, consider 8 communicators, all of which cover 65,536 OSI's. According to the exemplary formulae and rules described above, each communicator may be assigned $T = \log N \times L$ tokens. Because N=65536 and L=16, 256 tokens are assigned to each communicator. Alternatively, if each communicator is assigned $T = (\log N)^2$ tokens, 256 tokens are still assigned to each communicator. Thus, the total memory promised to each communicator is $M = T \times S$. Because T=256 and S=16 kilobytes, 4 megabytes of memory is promised to each communicator. Therefore, 32 megabytes of memory is required to allow the full pipeline of non-synchronous collective communication operations on 8 communicators concurrently.

Given the exemplary upper bound of 36 megabytes for the size of the memory pool, only 4 megabytes remain to support eager messages for other communicators. Continuing the example described above, a ninth communicator, again covering 65,536 OSI, performs a collective communications call. According to the formulae, the communicator would be assigned T=256 tokens and promised M=4 megabytes of the memory pool. However, the rule specifying that if M>((total_mem−mem_asgn)/2), then M is reduced to ((total_mem−mem_asgn)/2), is applied. Because total_mem is 36 megabytes and mem_asgn is 32 megabytes, M is reduced to 2 megabytes. T is reduced proportionately to 128. Therefore, the communicator is instead assigned T=128 tokens and promised M=2 megabytes of the memory pool.

At this point, only 2 megabytes remain which may be promised to other communicators. Continuing the example described above, a tenth communicator, again covering 65,536 OSI, performs a collective communications call. This communicator likewise is only promised half of the remaining memory which can be allocated to the buffer pool. Thus, the tenth communicator is assigned 64 tokens and promised 1 megabyte of the memory pool. Each successive communicator, assuming each communicator has 65,536 OSI, will receive half as many tokens and be promised half as much memory as the preceding communicator. Eventually, once it is not possible to assign even one token to a communicator, no tokens will be assigned in response to a request for tokens.

It is emphasized that the actual number of tokens assigned to a communicator determines the actual pipeline depth for non-synchronizing collective communication operations. For example, in the case of the tenth communicator above, 64 tokens were assigned. Using the formula $T = \log N \times L$, and given that T=64 and log N=16, we can determine that the pipeline depth (L) is 4 for the tenth communicator.

If a communicator does not have enough tokens for even a single short message collective communication operation, then algorithms using eager messages will be forced to call barrier synchronization before carrying out every collective communication operation on that communicator. Barrier synchronization is described below with regard to FIG. 6.

It is contemplated that the exemplary values described above, wherein the pipeline depth (L) is 16, the size of an early arrival buffer (S) is 16 kilobytes, and the upper bound of the size of the memory pool (total_mem) is 36 megabytes, is sufficient for most parallel applications based on the considerations outlined above.

It is emphasized that the techniques outlined above beneficially optimize the memory usage of early arrival buffers according to the size of the communicator and the type of the collective communication operation.

The system 402 may further include a token restoration unit 408. The token restoration unit identifies tokens which are not in use and not marked as available. The token restoration unit subsequently marks the identified tokens as available. Specifically, the token restoration unit may perform the exemplary operations shown in FIG. 6.

The token restoration unit 408 may be implemented at a computing system such as any of the exemplary computing systems 104 of FIG. 1. The token restoration unit may comprise computer code written in any of a variety of programming languages known in the art. Such programming languages may include object oriented programming languages such as C++, Java or the like. Such programming languages may also include conventional procedural programming languages, such as C, FORTRAN or the like. The token restoration unit 408 may be comprised by a library implementing the Message Passing Interface.

Additional detail about the one or more communicators 116 is now provided in light of the details of assigning tokens described above.

Each of the one or more communicators 116 is configured to perform a collective communication operation. The collective communication operation may have any or all of the properties discussed with regard to the collective communication operation 216 of FIG. 2. Similarly, the collective communication operation may include any intermediate operation discussed with regard to the collective communication operation 216 of FIG. 2. Such intermediate operations may include those operations shown in FIG. 3. Notably, the collective communication operation comprises one or more point-to-point communication operations between a first process 110 and a second process 124. The first process and the second process are comprised by the communicator performing the collective communication operation.

A point-to-point communication operation between a first process 110 and a second process 124 may include any or all of the operations shown in FIG. 3. Notably, at least one of the point-to-point communication operations may comprise requesting an early arrival buffer. The early arrival buffer is included in the memory pool. Requesting the early arrival buffer requires consuming at least one token. At least one of the point-to-point communication operations may further comprise receiving the early arrival buffer after consuming the at least one token. At least one of the point-to-point communication operations may further comprise eagerly sending a message from the first process via the early arrival buffer such that the sending operation is completed without acknowledgment that the recipient of the message is ready to receive the message. At least one of the point-to-point communication operations may further comprise receiving the message at the second process via the early arrival buffer.

Turning now to FIG. 5, an exemplary flowchart of operations for performing token management according to the present invention is shown.

Figure 6:
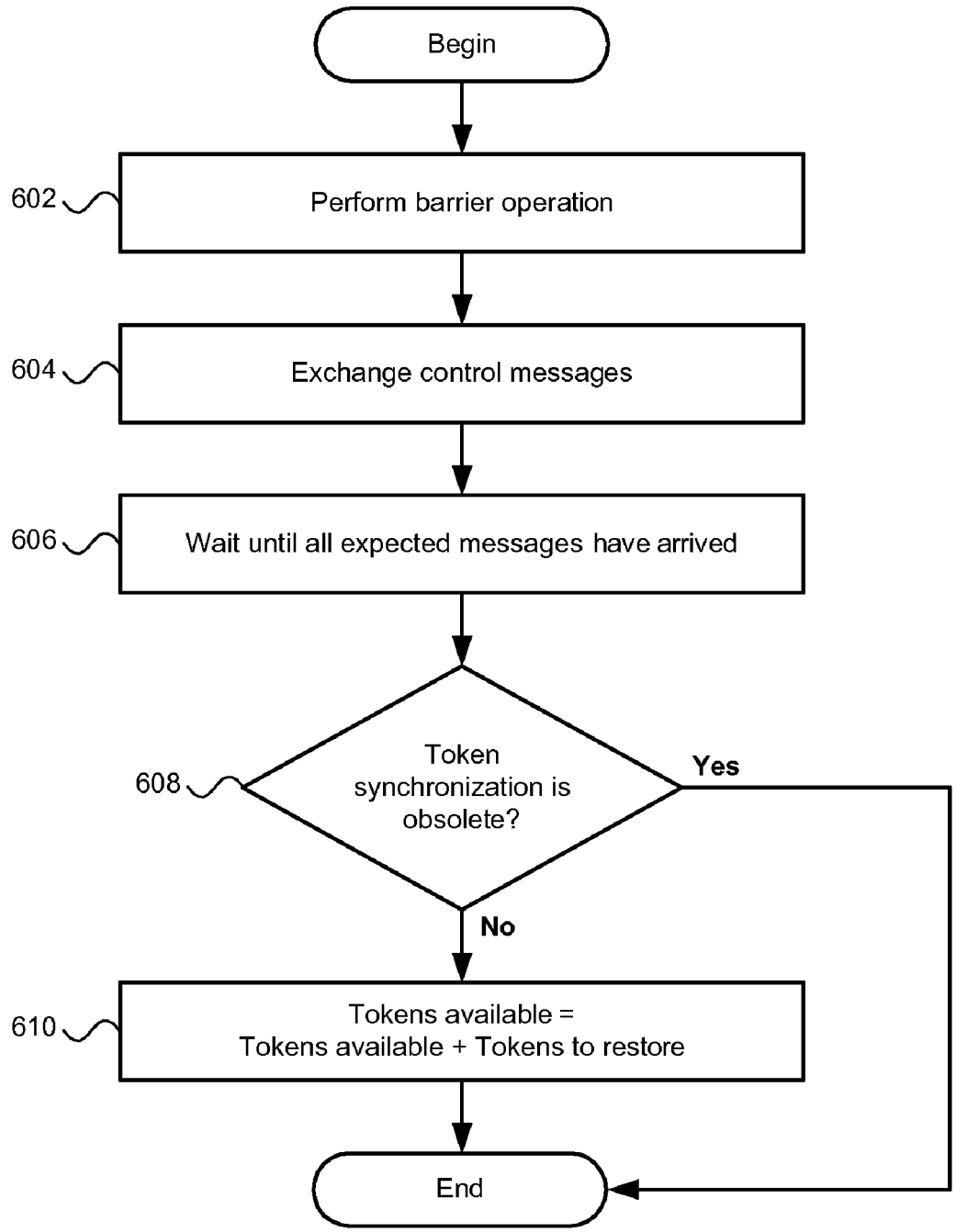
FIG. 6 shows an exemplary flowchart of operations for performing a token synchronization operation according to the present invention.

When an application calls multiple consecutive non-synchronizing collective communication operations on a communicator, and when the algorithms for the collective communication operations use one or more eager protocols, tokens assigned to the communicator can be used up. Therefore, the present invention includes a mechanism to restore tokens such that the tokens are again available for sending future eager messages. FIGS. 5 and 6 show exemplary sequences of operations for implementing this mechanism.

It is emphasized that the exemplary operations shown in FIG. 5 are performed for a specific communicator.

At querying operation 502, information about the preceding collective communication operation for the communicator is queried. This information may be saved in the CCS for the communicator. Thus, querying operation 502 may involve checking the information stored at the CCS for the communicator. After querying operation 502 is completed, control passes to determining operation 504.

At determining operation 504, it is determined whether the preceding collective communication operation for the communicator was a synchronizing collective communication operation. If there was a preceding collective communication operation for the communicator, and if the preceding collective communication operation was a synchronizing collective communication operation, control passes to subtracting operation 506. Otherwise, control passes to determining operation 512.

At subtracting operation 506, the number of tokens available to the communicator is set to the number of tokens assigned to the communicator minus the number of tokens used by the preceding collective communication operation. After subtracting operation 506 is completed, control passes to determining operation 508.

At determining operation 508, it is determined whether there is a background token synchronization operation in progress for restoring tokens. If there is a background token synchronization operation in progress, control passes to marking operation 510. Otherwise, control passes to determining operation 512.

At marking operation 510, the background token synchronization operation in progress is marked as obsolete. If a background token synchronization operation is set to obsolete, it will complete but will have no effect on the number of tokens available to the communicator. Tokens are restored after the completion of a collective communication operation which is synchronizing in semantic. Therefore, the background token synchronization operation is redundant.

In an embodiment of the present invention, all token synchronization operations are allowed to eventually complete. However, only the completion of an active background token synchronization restores tokens. This avoids blocking synchronizing collective communication operations which can make progress and guarantees that the number of available tokens is updated correctly. It is noted that if an obsolete token synchronization were to update the number of available tokens, the number may be updated to an incorrect value because the number determined by the obsolete token synchronization does not represent current information.

When a token synchronization operation is started, the value of the token_sync_seq field is used as the sequence number of the operation. token_sync_seq is then itself incremented by one. The cur_token_sync field saves the sequence number of the current active background token synchronization. Thus, changing the value of the cur_token_sync field to an invalid value causes the current active background token synchronization to be marked as obsolete. In an embodiment of the present invention, background token synchronization operations are marked as obsolete by changing the value of the cur_token_sync field to a negative number.

After marking operation 510 is completed, control passes to determining operation 512.

At determining operation 512, it is determined whether the current collective communication operation uses an eager protocol. If the current collective communication operation does not use an eager protocol, it is unnecessary to perform a token synchronization because tokens are only necessary when sending messages eagerly. If the current collective communication operation uses an eager protocol, control passes to determining operation 514. If the current collective communication operation does not use an eager protocol, control passes to determining operation 532.

At determining operation 514, it is determined whether the number of tokens available to the communicator is sufficient to complete the current collective communication operation. If the number of tokens available is sufficient, control passes to determining operation 532. If the number of tokens available is not sufficient, control passes to determining operation 516.

At determining operation 516, it is determined whether the number of tokens available to the communicator is less than the number of tokens assigned to the communicator. If the number of available tokens is less than the number of assigned tokens, control passes to determining operation 518. Otherwise, control passes to determining operation 532. It is noted that as a result, a token synchronization is only performed if the number of available tokens is less than the number of assigned tokens.

At determining operation 518, it is determined whether there is a background token synchronization in progress for restoring tokens for this communicator. Determining operation 518 may comprise reading a flag in the CCS for the communicator which specifies whether or not a background token synchronization is in progress. If there is a background token synchronization in progress, control passes to storing operation 522. Otherwise, control passes to scheduling operation 520.

At scheduling operation 520, a token synchronization operation is scheduled to restore tokens. The token synchronization operation may be scheduled to execute in the background. The token synchronization operation may include the exemplary operations shown in FIG. 6. After scheduling operation 520 is completed, control passes to storing operation 522. It is emphasized that processing continues within the exemplary sequence of operations shown in FIG. 5 even as the token synchronization operation continues to execute in the background.

At storing operation 522, a descriptor of the current collective communication operation is stored in the CCS for the communicator. The descriptor may be a collective communication operation descriptor as described above. All parameters passed to the collective communication operation are included in the descriptor. This beneficially allows the collective communication operation to be resumed along with any necessary parameters once the token synchronization is complete. After storing operation 522 is completed, control passes to blocking operation 524.

At blocking operation 524, the current collective communication operation is blocked until the token synchronization operation in progress completes. The current collective communication operation is blocked whether the token synchronization operation was invoked at scheduling operation 520 or was already in progress. After blocking operation 524 is completed, control passes to coordinating operation 526.

At communication operation 526, communication progress for the background token synchronization operation is driven. Coordinating operation 526 may be omitted if the background token synchronization operation was not invoked at scheduling operation 520. After coordinating operation 526 is completed, control passes to waiting operation 528.

At waiting operation 528, an idle state occurs until the background token synchronization operation is complete. A token synchronization operation may be implemented by exchanging control messages among all processes included in the communicator. Thus, waiting operation 528 may complete when all expected control messages have been received. When the token synchronization operation completes, it is contemplated that tokens have been restored. After waiting operation 528 is completed, control passes to resuming operation 530.

At resuming operation 530, the current collective communication operation is resumed. Resuming operation 530 may comprise accessing a collective communication operation descriptor to determine the parameters passed to the blocked collective communication operation. A pointer to the collective communication operation descriptor may be contained in the cc_op_desc field of the CCS for this communicator. Resuming operation 530 may further comprise calling the collective communication operation again, passing any previously stored parameters. It is contemplated that sufficient tokens are available to the communicator for the collective communication operation to be successfully executed eagerly. The collective communication operation can therefore continue its work. After resuming operation 530 is completed, control passes to determining operation 532.

At determining operation 532, it is determined whether the current collective communication operation is a synchronizing collective communication operation. If the current collective communication operation is a synchronizing collective communication operation, control passes to determining operation 540. If the current collective communication operation is a non-synchronizing collective communication operation, control passes to determining operation 534.

At determining operation 534, it is determined whether the number of tokens available is less than a predefined threshold. If the number of tokens available is less than the predefined threshold, control passes to determining operation 536. Otherwise, the token management operation completes.

At determining operation 536, it is determined whether an active background token synchronization is in progress. In this case, instantiating an additional token synchronization is redundant because the token synchronization which is in progress will restore tokens. Thus, if an active background token synchronization is in progress, the token management operation completes. Otherwise, processing continues with scheduling operation 538.

At scheduling operation 538, a token synchronization operation is scheduled to restore tokens. The token synchronization operation may include the exemplary operations shown in FIG. 6.

The token synchronization operation may be scheduled to execute in the background. This beneficially allows a collective communication algorithm to continue executing. In fact, the application may have no knowledge that a token synchronization operation is in progress.

Once the token synchronization operation is invoked, the token management operation completes. This is the case even if the token synchronization operation is continuing to execute in the background.

At determining operation 540, it is determined whether there is a background token synchronization operation in progress for restoring tokens. If there is a background token synchronization operation in progress, control passes to marking operation 542. Otherwise, the token management operation completes.

At marking operation 542, the background token synchronization operation in progress is marked as obsolete. Marking operation 542 may comprise any of the exemplary operations described above regarding marking operation 510. Once marking operation 542 completes, the token management operation completes.

It is contemplated that all processes associated with a communicator will reach the same decision to begin token synchronization. Whether a token synchronization operation should be performed is determined entirely by the collective communication calling sequence of the application. The determination is unaffected by timing.

Moreover, it is possible, although unlikely, for multiple obsolete background token synchronization operations to be in progress simultaneously. It is noted that these operations must not interfere with each other. This may be achieved by not updating the number of available tokens in response to any obsolete token synchronization operation as described above. In this case, the multiple obsolete token synchronization operations will not interfere with each other because none will have any effect.

As previously discussed, the token_sync_list field in the CCS for the communicator contains a linked list of descriptors of token synchronization operations which are in progress. When a control message for a token synchronization arrives at a process, the token_sync_list field may be scanned to see if there is already one token synchronization operation descriptor having the same sequence number in the list. If MPI at the process does not find a descriptor having the same sequence number, a new token synchronization operation descriptor may be added to the list contained in the token_sync_list field.

A token synchronization operation may be completed by an incoming control message. When a token synchronization operation is completed, the token synchronization operation descriptor is removed from the list contained in the token_sync_list field. Furthermore, if the cc_op_desc field of the token synchronization operation descriptor is not equal to NULL, the token synchronization must have blocked a collective communication algorithm. In this case, the collective collection algorithm is restarted. Restarting a collective collection algorithm may comprise performing restarting operation 530 as described above.

Turning now to FIG. 6, an exemplary flowchart of operations for performing a token synchronization operation according to the present invention is shown. The operations shown in FIG. 6 may be performed by a token restoration unit such as the exemplary token restoration unit 408 of FIG. 4.

At identifying operation 602, tokens which are not in use and not marked as available are identified.

At barrier operation 602, a barrier operation is performed. As used herein, a barrier operation may have the same semantic as the MPI_BARRIER operation defined by the Message Passing Interface specification "MPI: A Message-Passing Interface Standard Version 2.1", Message Passing Interface Forum (Sep. 4, 2008) (see www.mpi-forum.org/docs/) incorporated herein by reference in its entirety. A barrier operation may also include any other barrier algorithm known in the art. Barrier operation 602 may be non-blocking. All processes included in the communicator may participate in barrier operation 602.

Barrier operation 602 may identify tokens which are not in use and not marked as available.

After barrier operation 602 is completed, control passes to exchanging operation 604.

At exchanging operation 604, control messages are exchanged. The control messages may contain the sequence number of the token synchronization operation. The control messages may also contain the number of available tokens at the time the token synchronization operation started. All processes included in the communicator may participate in exchanging operation 604. After exchanging operation 604 is completed, control passes to waiting operation 606.

At waiting operation 606, an idle state occurs until all expected messages have arrived at the process. The barrier algorithm may determine whether all expected messages have arrived. All processes included in the communicator may perform exchanging operation 606. After waiting operation 606 is completed, control passes to determining operation 608.

At determining operation 608, is determined whether the token synchronization operation is obsolete. All processes included in the communicator may perform determining operation 608. Determining operation 608 may be performed by MPI.

Determining operation 608 may comprise comparing the cur_token_sync field in the CCS for the communicator with the value of the sync_seq field in the token synchronization operation descriptor. If the values are the same, the token synchronization operation is determined to be active (not obsolete). If the values are different, the token synchronization operation is determined to be obsolete.

If determining operation 608 determines that the token synchronization operation is obsolete, the token synchronization operation completes. It is emphasized that no tokens are restored in this case. For the reasons previously discussed, it is unnecessary and even detrimental to act on the result of an obsolete token synchronization operation.

If determining operation 608 does not determine that the token synchronization operation is obsolete, control passes to adding operation 610.

At adding operation 610, the number of available tokens is updated. As a result, the tokens identified at barrier operation 602 are marked as available. Adding operation 610 may be performed by MPI.

Specifically, the value of the tokens_to_restore field in the token synchronization operations descriptor may be added to the token_avai field in the CCS for the communicator. The tokens_to_restore field may contain a value equal to the number of tokens assigned to the communicator minus the number of tokens available to the communicator at the time the token synchronization operation started.

After adding operation 610 is completed, the token synchronization operation completes.

It is noted that the token synchronization operations are purely driven by the progress of communication, as opposed to the collective communication calling thread performing synchronization specific operations.

Those skilled in art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, conventional processor, controller, microcontroller, state machine, etc. A processor can also be implemented as a combination of computing devices, e.g., a combination of a DSP and a microprocessor, a plurality of microprocessors, one or more microprocessors in conjunction with a DSP core, or any other such configuration. In addition, the term "processing" is a broad term meant to encompass several meanings including, for example, implementing program code, executing instructions, manipulating signals, filtering, performing arithmetic operations, and the like.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD, or any other form of storage medium known in the art. A storage medium is coupled to the processor such that the processor can read information from, and write information to, the storage medium. In the alternative, the storage medium may be integral to the processor. The processor and the storage medium can reside in an ASIC. The ASIC can reside in a user terminal. In the alternative, the processor and the storage medium can reside as discrete components in a user terminal.

The modules can include, but are not limited to, any of the following: software or hardware components such as software object-oriented software components, class components and task components, processes, methods, functions, attributes, procedures, subroutines, segments of program code, drivers, firmware, microcode, circuitry, data, databases, data structures, tables, arrays, or variables.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for facilitating collective communication in a system for parallel computing, the system including one or more communicators, each of the one or more communicators comprising a plurality of processes, the method comprising:
providing a memory pool including one or more early arrival buffers for storing messages;
assigning one or more tokens to a specified communicator included in the one or more communicators, wherein each of the plurality of processes comprised by the specified communicator may consume any of the one or more tokens assigned to the specified communicator;
performing a collective communication operation using the specified communicator, the collective communication operation comprising one or more point-to-point communication operations between a first process and a second process, the first process and the second process comprised by the specified communicator, wherein at least one of the one or more point-to-point communication operations comprises:
eagerly sending a message from the first process such that sending the message is completed without acknowledgement that a recipient of the message is ready to receive the message;
requesting memory allocation in the memory pool for an early arrival buffer, the early arrival buffer included in the memory pool, wherein requesting the early arrival buffer requires at least one token;
receiving the memory allocation for the early arrival buffer; and
receiving the message at the second process via the early arrival buffer; and
decrementing a number of tokens available to the specified communicator by a number specific to the collective communication operation.

2. The method of claim 1, wherein the memory pool is shared among two or more communicators.

3. The method of claim 1, further comprising:
performing an allreduce operation to calculate a number of early arrival buffers required by the collective communication operation; and
releasing at least one of the tokens assigned to the specified communicator if the number of early arrival buffers required by the collective communication operation is less than the number of tokens assigned to the specified communicator.

4. The method of claim 1, wherein a count of the one or more tokens assigned to the specified communicator is proportional to a logarithm of a count of all operating system instances executing the plurality of processes comprised by the specified communicator.

5. The method of claim 1, wherein a count of the one or more tokens assigned to the specified communicator is proportional to a square of a logarithm of a count of all operating system instances executing the plurality of processes comprised by the specified communicator.

6. The method of claim 1, further comprising:
identifying tokens which are not in use and not marked as available; and
marking the identified tokens as available.

7. The method of claim 6, wherein identifying tokens which are not in use and not marked as available includes performing a barrier operation.

8. A system for facilitating collective communication for parallel computing, the system comprising:
one or more communicators, wherein each of the one or more communicators comprises a plurality of processes; and a memory management unit comprising:
  a memory pool including one or more early arrival buffers for storing messages; and
  an assigning unit configured to assign one or more tokens to a specified communicator included in the one or more communicators, wherein each of the plurality of processes comprised by the specified communicator may consume any of the one or more tokens assigned to the specified communicator;
  wherein each of the one or more communicators is configured to perform a collective communication operation, the collective communication operation comprising one or more point-to-point communication operations between a first process and a second process, the first process and the second process comprised by the communicator, wherein at least one of the one or more point-to-point communication operations comprises:
  eagerly sending a message from the first process such that sending the message is completed without acknowledgement that a recipient of the message is ready to receive the message;
  requesting memory allocation in the memory pool for an early arrival buffer, the early arrival buffer included in the memory pool, wherein requesting the early arrival buffer requires at least one token;
  receiving the memory allocation for the early arrival buffer; and
  receiving the message at the second process via the early arrival buffer; and
  wherein each of the one or more communicators is further configured to decrement a number of tokens available to the communicator by a number specific to the collective communication operation.

9. The system of claim 8, wherein the memory pool is shared among two or more communicators.

10. The system of claim 8, wherein a specified communicator included in the one or more communicators is configured to:
  perform an allreduce operation to calculate a number of early arrival buffers required by the collective communication operation which the specified communicator is configured to perform; and
  release at least one of the tokens assigned to the specified communicator if the number of early arrival buffers required by the collective communication operation which the specified communicator is configured to perform is less than the number of tokens assigned to the specified communicator.

11. The system of claim 8, wherein a count of the one or more tokens assigned to a specified communicator included in the one or more communicators is proportional to a logarithm of a count of all operating system instances executing the plurality of processes comprised by the specified communicator.

12. The system of claim 8, wherein a count of the one or more tokens assigned to a specified communicator included in the one or more communicators is proportional to a square of a logarithm of a count of all operating system instances executing the plurality of processes comprised by the specified communicator.

13. The system of claim 8, further comprising a token restoration unit configured to:
  identify tokens which are not in use and not marked as available; and
  mark the identified tokens as available.

14. The system of claim 13, wherein identifying tokens which are not in use and not marked as available includes performing a barrier operation.

15. A computer program product embodied in computer readable memory comprising:
  computer readable program codes coupled to the computer readable memory for facilitating collective communication in a system for parallel computing, the system including one or more communicators, each of the one or more communicators comprising a plurality of processes, the computer readable program codes configured to cause the program to:
  provide a memory pool including one or more early arrival buffers for storing messages;
  assign one or more tokens to a specified communicator included in the one or more communicators, wherein each of the plurality of processes comprised by the specified communicator may consume any of the one or more tokens assigned to the specified communicator;
  perform a collective communication operation using the specified communicator, the collective communication operation comprising one or more point-to-point communication operations between a first process and a second process, the first process and the second process comprised by the specified communicator, wherein at least one of the one or more point-to-point communication operations comprises:
  eagerly sending a message from the first process such that sending the message is completed without acknowledgement that the recipient of the message is ready to receive the message;
  requesting memory allocation in the memory pool for an early arrival buffer, the early arrival buffer included in the memory pool, wherein requesting the early arrival buffer requires at least one token;
  receiving the memory allocation for the early arrival buffer; and
  receiving the message at the second process via the early arrival buffer; and
  decrement a number of tokens available to the specified communicator by a number specific to the collective communication operation.

16. The computer program product of claim 15, wherein the memory pool is shared among two or more communicators.

17. The computer program product of claim 15, wherein the computer readable program codes are further configured to cause the program to:
  perform an allreduce operation to calculate a number of early arrival buffers required by the collective communication operation; and
  release at least one of the tokens assigned to the specified communicator if the number of early arrival buffers required by the collective communication operation is less than the number of tokens assigned to the specified communicator.

18. The computer program product of claim 15, wherein a count of the one or more tokens assigned to the specified communicator is proportional to a logarithm of a count of all operating system instances executing the plurality of processes comprised by the specified communicator.

19. The computer program product of claim 15, wherein a count of the one or more tokens assigned to the specified communicator is proportional to a square of a logarithm of a count of all operating system instances executing the plurality of processes comprised by the specified communicator.

20. The computer program product of claim 15, wherein the computer readable program codes are further configured to cause the program to:

identify tokens which are not in use and not marked as available; and mark the identified tokens as available.

* * * * *